(12) United States Patent
Lipman et al.

(10) Patent No.: US 8,795,022 B2
(45) Date of Patent: Aug. 5, 2014

(54) INTERACTING TOYS

(75) Inventors: Steven Lipman, London (GB); Robert Frederick Kilbride-Newman, Witney (GB); Ian Green, London (GB); Jeffrey Heine, St. Albans (GB); Alon Shmuel, London (GB)

(73) Assignee: Hydrae Limited, Ramsey (IM)

( * ) Notice: Subject to any disclaimer, the term of this patent is extended or adjusted under 35 U.S.C. 154(b) by 1184 days.

(21) Appl. No.: 12/528,782

(22) PCT Filed: Jul. 18, 2008

(86) PCT No.: PCT/GB2008/002457
§ 371 (c)(1),
(2), (4) Date: Mar. 22, 2010

(87) PCT Pub. No.: WO2009/010760
PCT Pub. Date: Jan. 22, 2009

(65) Prior Publication Data
US 2012/0015734 A1 Jan. 19, 2012

(51) Int. Cl.
*A63H 30/00* (2006.01)
*H04L 29/08* (2006.01)

(52) U.S. Cl.
CPC ............ *A63H 30/00* (2013.01); *H04L 67/2833* (2013.01)
USPC ........................................................ 446/175

(58) Field of Classification Search
CPC ............................ H04L 57/2833; A63H 30/00
USPC ........................................................ 446/175
See application file for complete search history.

(56) References Cited

U.S. PATENT DOCUMENTS

| 4,247,108 A | 1/1981 | Tilbor et al. |
| 4,857,030 A | 8/1989 | Rose |
| 5,314,336 A | 5/1994 | Diamond |
| 5,587,545 A | 12/1996 | Nakada et al. |
| 5,636,994 A | 6/1997 | Tong |

(Continued)

FOREIGN PATENT DOCUMENTS

| EP | 1 092 458 | 4/2001 |
| EP | 1 107 227 A2 | 6/2001 |

(Continued)

OTHER PUBLICATIONS

Michael Kaminsky, et al., "SWEETPEA: Software Tools for Programmable Embodied Agents," Proceedings of the SIGCHI Conference on Human Factors in Computing Systems. CHI '99, pp. 144-151 (May 15-20, 1999).

(Continued)

*Primary Examiner* — Corbett B Coburn
(74) *Attorney, Agent, or Firm* — Blakely, Sokoloff, Taylor & Zafman LLP

(57) ABSTRACT

There is provided a toy comprising: a processor (200); a memory coupled to said processor (202); an output (210) coupled to said processor; and means (212) for establishing a network connection with at least one further such toy; wherein the processor includes means for controlling the output of each toy with which a network connection has been established. Furthermore, the controlling means is adapted to transmit, over said network connection, instructions to control a plurality of the outputs (preferably all of the outputs) of each toy with which a network connection has been established.

25 Claims, 17 Drawing Sheets

(56) References Cited

U.S. PATENT DOCUMENTS

| | | | |
|---|---|---|---|
| 6,089,942 | A | 7/2000 | Chan |
| 6,110,000 | A | 8/2000 | Ting |
| 6,246,927 | B1 | 6/2001 | Dratman |
| 6,255,800 | B1 | 7/2001 | Bork |
| 6,319,010 | B1 | 11/2001 | Kikinis |
| 6,356,867 | B1 | 3/2002 | Gabai et al. |
| 6,368,177 | B1 | 4/2002 | Gabai et al. |
| 6,544,098 | B1 | 4/2003 | Hampton et al. |
| 6,631,351 | B1 | 10/2003 | Ramachandran et al. |
| 6,663,393 | B1 | 12/2003 | Ghaly |
| 6,822,154 | B1 | 11/2004 | Thai |
| 7,297,044 | B2 | 11/2007 | Small |
| 7,553,756 | B2 | 6/2009 | Hayashi et al. |
| 8,324,492 | B2 | 12/2012 | Feeney et al. |
| 8,540,546 | B2 | 9/2013 | Lipman |
| 2001/0032278 | A1 | 10/2001 | Brown et al. |
| 2002/0000062 | A1 | 1/2002 | Smirnov |
| 2002/0029388 | A1 | 3/2002 | Heisele |
| 2002/0049606 | A1 | 4/2002 | Dan et al. |
| 2003/0003839 | A1 | 1/2003 | Lin |
| 2003/0023347 | A1* | 1/2003 | Konno et al. .......... 700/245 |
| 2003/0130851 | A1 | 7/2003 | Nakakita et al. |
| 2004/0082255 | A1 | 4/2004 | Fong et al. |
| 2004/0198158 | A1 | 10/2004 | Driscoll et al. |
| 2004/0229696 | A1 | 11/2004 | Beck |
| 2004/0259465 | A1 | 12/2004 | Wright et al. |
| 2005/0009443 | A1 | 1/2005 | Martin et al. |
| 2005/0157668 | A1 | 7/2005 | Sivan |
| 2005/0186884 | A1 | 8/2005 | Evans |
| 2005/0215170 | A1 | 9/2005 | Poesch |
| 2007/0128979 | A1 | 6/2007 | Shackelford et al. |
| 2009/0069084 | A1 | 3/2009 | Reece et al. |
| 2009/0117816 | A1 | 5/2009 | Nakamura |
| 2009/0137323 | A1 | 5/2009 | Fiegener et al. |
| 2010/0018382 | A1 | 1/2010 | Feeney et al. |
| 2011/0143631 | A1 | 6/2011 | Lipman |
| 2013/0304806 | A1* | 11/2013 | Brown et al. .......... 709/203 |

FOREIGN PATENT DOCUMENTS

| | | |
|---|---|---|
| EP | 1 776 990 | 4/2007 |
| GB | 2 365 364 A | 2/2002 |
| GB | 2 423 943 | 9/2006 |
| JP | 11-207031 A | 8/1999 |
| JP | 2001-179665 A | 7/2001 |
| JP | 2002-063092 A | 2/2002 |
| JP | 2002-292154 A | 10/2002 |
| JP | 2005-001099 A | 1/2005 |
| WO | WO 99/17854 | 4/1999 |
| WO | WO 00/15316 A2 | 3/2000 |
| WO | WO 00/15316 A3 | 3/2000 |
| WO | WO 00/44460 A3 | 8/2000 |
| WO | WO 01/12285 A1 | 2/2001 |
| WO | WO 01/58552 A1 | 8/2001 |
| WO | WO 02/02200 | 1/2002 |
| WO | WO 02/13935 | 2/2002 |
| WO | WO 03/000370 | 1/2003 |
| WO | WO 03/045522 | 6/2003 |
| WO | WO 2004/104736 | 12/2004 |
| WO | WO 2006/114625 | 11/2006 |
| WO | WO 2007/131118 | 11/2007 |
| WO | WO 2009/119959 A1 | 10/2009 |
| WO | WO 2010/007336 A1 | 1/2010 |
| WO | WO 2011/124916 A1 | 10/2011 |

OTHER PUBLICATIONS

Andy Walker, "How new technologies are changing the nature of play," Cyberwalker Media Syndicate, http://www.cyberwalker.net/features/kids-tech-toyrs.shtml, 5 pgs. (May 4, 2005).

Michael Resnick, et al., "Digital Manipulatives: New Toys to Think With," MIT Media Libiary, http://web.media.mit.edu/~mres/papers/chi-98/digital-manip.html, pp. 1-11 (Mar. 31, 2005).

PCT International Search Report and Written Opinion for PCT Counterpart Application No. PCT/GB2008/002457 containing Communication relating to the Results of the Partial International Search Report, 22 pgs., (May 11, 2009).

Patents Act 1977: Search Report under Section 17 for United Kingdom Counterpart Application No. GB0714148.4, Claims Searched: 1 plus dependent claims, 2 pgs., (Mar. 26, 2008).

Patents Act 1977: Further Search Report under Section 17 for United Kingdom Counterpart Application No. GB0714148.4, Claims Searched: 14-17, 1 pg., (Jul. 2, 2008).

Patents Act 1977: Further Search Report under Section 17 for United Kingdom Counterpart Application No. GB0714148.4, Claims Searched: 19-22, 1 pg., (Jul. 3, 2008).

Patents Act 1977: Further Search Report under Section 17 for United Kingdom Counterpart Application No. GB0714148.4, Claims Searched: 30-49, 1 pg., (Jul. 3, 2008).

UK Intellectual Property Office, "Patents Act 1977: Search Report under Section 17" for Great Britain Patent Application No: GB0714148.4, mailing date of Search Report: Mar. 27, 2008 (5 pp.).

Peter Rojas, "The Garfield MP3 Player," Engadget, p. 1, http:www.engadget.com/2004/11/05/the-garfield-mp3-player (Nov. 5, 2004).

Patents Act 1977: Search Report under Section 17 for GB Patent Application No. 05084166.0, 1 pg. (Nov. 29, 2005).

Patents Act 1977: Search Report under Section 17 for GB Patent Application No. 0604215.4, 2 pgs, (Apr. 7, 2006).

Office Action for Counterpart Japanese Patent Application No. 2012-179580, 6 pgs., (Feb. 26, 2014).

Patents Act 1977: Search Report under Section 17(6) for United Kingdom Counterpart Application No. GB1222755.9, Claims Searched: 12-44, 2 pgs., (Dec. 5, 2013).

Patents Act 1977: Search Report under Section 17(6) for United Kingdom Counterpart Application No. GB1222755.9, Claims Searched: 45-51, 3 pgs., (Dec. 5, 2013).

Patents Act 1977: Search Report under Section 17(6) for United Kingdom Counterpart Application No. GB1222755.9, Claims Searched: 80-97, 3 pgs., (Dec. 5, 2013).

* cited by examiner

INTERACTING TOYS

CROSS-REFERENCE TO RELATED APPLICATIONS

This patent application is a U.S. National Phase application under 35 U.S.C. §371 of International Application No. PCT/GB2008/002457, filed on Jul. 18, 2008, entitled INTERACTING TOYS, which claims priority to Great Britain patent application number 0714148.4, filed Jul. 19, 2007.

FIELD

This invention relates to toys. In particular, although not exclusively, this invention relates to toys such as dolls that interact with each other.

BACKGROUND

Embedded computers and micro-processors have improved toys for children. They have been used most extensively in educational toys, but have also been used in interactive toys. ActiMates® Barney® is one example of an interactive toy which responds to interaction from a child by appropriate vocalisations, and can sing-a-long to videos.

INCORPORATION-BY-REFERENCE OF A COMPUTER PROGRAM LISTING APPENDIX SUBMITTED AS A TEXT FILE VIA THE OFFICE ELECTRONIC FILING SYSTEM (EFS-WEB)

A Computer Program Listing Appendix, in the form of an ASCII text file and pursuant to 37 C.F.R. §§1.52, 1.77, and 1.96 has been filed via EFS-WEB. The ASCII text file was created on May 29, 2014, the ASCII text file is sixty-three kilobytes (63 KB) and the name of the ASCII text file is "6965P008 COMPUTER PROGRAM LISTING APPENDIX: Theme examples."

The entirety of the material in "6965P008 COMPUTER PROGRAM LISTING APPENDIX: Theme examples" is incorporated by reference into this patent application.

PCT patent application WO 2006/114625 is incorporated herein by reference.

SUMMARY

Authoring Tool

According to a first aspect of the present invention there is provided an authoring tool for creating themed data for toys, comprising means for receiving content relating to a particular theme; means for processing said content to generate a set of instructions for operating said toy within said particular theme; and means for outputting said set of instructions. By providing means for generating a set of instructions for operating a toy the process of generating themed instruction is made substantially more efficient.

For efficiency of receiving the content, preferably said receiving means is adapted to receive content that comprises separately both scripting data relating to the particular theme, and expression data defining the personality of said toy. Preferably, said receiving means is adapted to receive content in discrete portions.

For efficiency of processing, preferably the authoring tool further comprises means for allocating a unique ID number to each expression data portion. Preferably, said processing means is adapted to utilise said unique ID numbers as references to said expression data portions in said set of instructions.

Preferably, said expression data comprises at least one of: a theme name, the toys' names and statements used by the toys to interact.

Preferably, said scripting data comprises at least one of: the number of toys that can interact within the theme, a method of interaction, theme related parameters, and toy related parameters.

For efficiency of processing, preferably the authoring tool further comprises means for storing together, in an array, said scripting data and expression data relating to a particular theme. More preferably, said processing means is adapted to generate said set of instructions from said array.

For efficiency of processing, preferably said processing means includes means for compiling at least one list comprising at least some of the expression data. More preferably, said list compiling means is adapted to compile a respective list for each toy in said particular theme.

Preferably, the expression data is symbolic data. Symbolic data as used herein connotes the written form of words, music or actions.

Preferably, the authoring tool further comprises recording means for recording enacted data versions of the symbolic data. Enacted data as used herein connotes the enacted form of words, music or actions.

Preferably, the authoring tool comprises means for prompting an actor to generate the requisite portion of enacted data.

Preferably, said processor is adapted to generate a look-up table between the symbolic data and enacted data.

Preferably, said processing means is adapted to output the expression data. More preferably, said processing means is further adapted to output the expression data and set of instructions separately.

Preferably, said processing means is adapted to generate a set of instructions that includes: a base set of instructions for controlling the basic functions of the toy; and a themed set of instructions for the base set of instructions to control the toy within the theme. More preferably, said processor is adapted to combine said base set and said themed set of instructions together.

Preferably the authoring tool further comprises a compiler. More preferably, said compiler is adapted to compile said base set and said themed set of instructions.

Preferably, said processor includes a coding engine adapted to transform said set of instructions into computer readable code.

Preferably, the output of the authoring tool is adapted to be used in a conversation engine as described herein.

Preferably, the toy is a toy as described herein.

According to a second aspect of the present invention, there is provided a user interface for an authoring tool for creating themed data for a toy, comprising: means for providing a user with a set of input windows, each window corresponding to the input of a particular sub-set of content relating to a theme; and means for initiating output of the themed data.

Preferably, said sub-sets of content include at least one of: theme related data, toy related data, and context related data.

Preferably, the context related data includes at least one of: statements used by the toys to interact, a method of interaction, theme related parameters, and toy related parameters.

According to a third aspect of the present invention, there is provided a system for generating themed data for a toy, comprising: an authoring tool for accessing, creating and editing said themed data; and a server, comprising a database for storing said themed data; wherein the authoring tool is adapted to access the themed data via the Internet.

Preferably, said authoring tool is adapted to process the themed data into an array, and said database is adapted to store said themed data in said array.

Preferably, said authoring tool is an authoring tool as described herein.

Preferably, the further comprises a user interface. More preferably, the user interface is an interface as described herein.

USB Communications Dongle

According to a further aspect of the present invention, there is provided a device for providing wireless communications between at least one toy as described herein, and a computer, comprising: a communication port for connecting the device to the computer; and means for establishing a network between the computer and the or each toy; wherein said device allows the computer to communicate with the or each toy as if it were another such toy.

Preferably, said device enables said computer to act as a virtual toy.

Preferably, said communication port is a USB communication port.

Preferably, said network is wireless.

According to a yet further aspect of the present invention, there is provided a system comprising: at least one toy as described herein; and at least one computer, each with a device for providing wireless communications as described herein; wherein the combination of said computer and device acts as if it were a toy as described herein.

Preferably, said computer comprises a visual, and an audio output adapted to provide a virtual toy. More preferably, said virtual toy is an avatar.

Controller Doll

According to a yet further aspect of the present invention, there is provided a toy comprising: a processor; a memory coupled to said processor; an output coupled to said processor; and means for establishing a network connection with at least one further such toy; wherein the processor includes means for controlling the output of each toy with which a network connection has been established.

Preferably, said controlling means is adapted to transmit, over said network connection, instructions to control a plurality of the outputs (preferably all of the outputs) of each toy with which a network connection has been established.

Preferably, said network connection forms part of a personal area network.

Preferably, said memory is adapted to store at least one group of data, each said at least one group representing a particular theme.

Preferably, the toy further comprises means for determining the at least one theme stored in said memory.

Preferably, said toy is adapted to only establish a connection with another toy when at least one theme stored in said memory is the same in both toys.

Preferably, said controlling means is adapted to transmit/receive a control message to control the output of each said toy, and wherein preferably the control message comprises an ID of the toy for which it is intended, and a command segment, and more preferably further comprises an ID of the originating toy and/or a message ID.

Preferably, said control message comprises instructions to access a reference database and perform a task.

Preferably, the processor includes means for transmitting/receiving acknowledgement of a transmitted/received control message, and wherein preferably said transmitting/receiving means is adapted to request that the control message is re-sent if it does not receive acknowledgement.

Preferably, said transmitting/receiving means is adapted to transmit a parameter associated with the time that such toy will take to generate an output in dependence on the control message, and wherein preferably the originating toy waits for a duration associated with said parameter before transmitting a further control message (the time such toy will take to generate such output may vary, according for example with a theme or sub-theme of the toy).

Preferably, the processor comprises means for counting the number of re-sent control messages, and whereby communication with said toy that does not acknowledge said control message is stopped after 1,000-2,000, 2,000-5,000, 5,000-10,000 or more attempts to resend.

Preferably, said processor further comprises a conversation engine adapted to construct a conversation between said toys.

Preferably, the further such toy is identical or substantially identical to the first such toy. Therefore, no "Spoke and Hub" arrangement is required.

Preferably, said means for establishing a network is a network controller, preferably a network controller utilising the Zigbee protocol.

Parameter Storage

Preferably, the toy is adapted to interact with another such toy, wherein said processor includes means for defining at least one variable associated with said interaction, means for storing said variable in said memory and means for using said variable to control an (interactive) output of said toy.

According to a yet further aspect of the present invention, there is provided a toy adapted to interact with another such toy, comprising: a processor; a memory coupled to said processor; and an output coupled to said processor; wherein said processor includes means for defining at least one variable associated with said interaction, means for storing said variable in said memory and means for using said variable in association with an (interactive) output of said toy (thereby preferably more efficiently keeping track of the interaction).

Preferably, said variable is used a plurality of times (more preferably a multiplicity of times) to control said output.

Preferably, said variable is used to determine the number, type or nature of said interaction, and wherein preferably said variable is said interaction.

Preferably, said variable is selected randomly or pseudo-randomly, and said random selection is affected by weightings.

Preferably, the toy further comprises means for generating an interaction. The means for generating an interaction is preferably adapted to generate the interaction in dependence upon the stored parameter.

Preferably, the storing means associates each variable with a toy.

Preferably, the storing means is memory located within the toy.

Preferably, the means for using the variable is adapted to access the variable from the storing means.

Preferably, said interaction is a communication between the toys.

Preferably, said variable is a word or phrase utilised in speech.

Expressing Personality and Scripting Themes

Preferably, said processor is adapted to store themed data in said memory, said theme comprising scripting data and expression data, said expression data defining the personality of said toy.

According to a yet further aspect of the present invention, there is provided a toy comprising: a processor; a memory coupled to said processor; and an output coupled to said processor; wherein said processor is adapted to store themed data in said memory, said theme comprising scripting data and expression data, said expression data defining the personality of said toy (thereby preferably providing multiple, themed, toy personalities more efficiently).

Preferably, the toy is adapted to interact with at least one other similar toy, wherein said scripting data is shared by each such toy and said expression data is different between each such toy.

Preferably, said scripting data is independent of said expression data.

Preferably, the processor is adapted to output the scripting data as a control message to another such toy, and is adapted to respond to a control message with its individual expression data.

Preferably, the scripting data is the same for each toy, and controls the output of each toy.

Preferably, the processor is adapted to utilise the scripting data to reference the expression data, and preferably the expression data communicates the same information using different content.

Preferably, the personality of the toy is defined by the content of the communication.

Doll Choice

Preferably, said processor includes means for selecting a toy to interact based on pre-defined rules.

According to a yet further aspect of the present invention, there is provided a toy adapted to interact with other such toys, comprising: a processor; a memory coupled to said processor; and an output coupled to said processor, wherein said processor includes means for selecting a toy to interact based on pre-defined rules, and wherein said selected toy may be the originating toy.

Preferably, said selecting means is adapted to select the next toy to interact.

Preferably, said pre-defined rules comprise: direct selection; random selection; and choose the current interacter to interact again.

Preferably, the processor is adapted to output a control message comprising the ID of the selected toy and preferably the ID of the originating toy.

Preferably, said interaction comprises communication and wherein preferably said communication includes speech and directions.

Game Playing

Preferably, the toy is in the form of an animate object, suitable for playing games with other similar toys, wherein said processor includes a games engine, wherein said games engine is adapted to allow said toy to play games as if the toy were animate.

According to a yet further aspect of the present invention, there is provided a toy in the form of an animate object, suitable for playing games with other similar toys, comprising: a processor; a memory coupled to said processor; an output coupled to said processor; wherein said processor includes a games engine that enables each said toy to play a game as if said toy were its relevant animate object.

Preferably, said games engine is adapted to enable a human game.

Preferably, said human game is played with games equipment.

Preferably, said games engine is adapted to output an instruction to enable a human to adjust the games equipment to play the game.

Preferably, said toy further comprises means for communicating with at least one further such toy.

Preferably, said games engine is further adapted to play rules based games.

Preferably, said game engine is adapted to store information regarding the game in said memory.

Preferably, said information comprises the rules of the game.

Preferably, said information further comprises the layout of at least one playing board.

Preferably, said games engine comprises a random number generator adapted to be a virtual die.

Preferably, the games engine comprises means for receiving an external input regarding the game.

Preferably, said external input is associated with the playing piece of the game.

Preferably, said external input is at least one sensor within the playing board.

Preferably, said external input is a switch adapted to be used by a user of said toy.

Preferably, said rules based games include Snakes and Ladders, and Ludo.

Preferably, said output is a transducer. Preferably, said transducer is a loudspeaker. Preferably, said transducer is an actuator.

According to a yet further aspect of the present invention, there is provided a combination comprising a plurality of such toys.

Preferably, each one of said plurality of toys comprises means for controlling the other said toys, whereby only one toy controls the other said toys at a time.

Preferably, said memory is adapted to store information relating to the game state. The game state may be at least one of: the layout of a playing board; the position of at least one counter on a playing board; and the order of play for all of the toys and/or user.

Doll Specific Download

According to a yet further aspect of the present invention, there is provided a device for providing a plurality of toys with themed data comprising: means for storing said themed data, wherein each said theme comprises a plurality of subthemes; means for identifying a specific toy; means for selecting a sub-theme according to the specific toy; and means for outputting said specific sub-theme to said toy (thereby preferably accessing themed downloads is accomplished more efficiently).

Preferably, the toy further comprises means for storing a plurality of different themes.

Preferably, the toy further comprises means for allowing a user to select one of the said plurality of themes.

Preferably, said means for identifying a specific toy uses a unique identification number of said toy.

Preferably, the toy further comprises means for encrypting each said sub-theme according to a parameter associated with said toy. Preferably, said parameter is the toy's unique identification number.

Preferably, the device comprises a processor and associated memory for storing the themed data and identifying the specific toy.

Preferably, the device further comprises a connection for outputting the sub-theme to the toy. Preferably the connection comprises the internet and a USB cable.

Conversation Engine

According to a yet further aspect of the present invention, there is provided a conversation engine for a device such as a toy comprising means for selecting a theme for the conversation; randomly choosing a starting point from a plurality of starting points; randomly choosing phrases based on variables; and randomly choosing the next speaker based on variables.

Preferably, said phrase choices are further based on weightings.

Preferably, the toy incorporates a conversation engine.

Preferably, the toy, or conversation engine, is adapted to receive input data from the user.

Preferably, the toy, or conversation engine, is adapted to output data to the user.

Preferably, the conversation engine is further adapted to utilise the input data from the user in random choosing process.

Preferably, the conversation engine comprises a processor adapted to carry out the selecting operation.

Preferably, the toy, or conversation engine, is adapted to construct the conversation in real-time.

Preferably, the toy, or conversation engine, is adapted to pre-process a conversation. The toy, or conversation engine, is preferably further adapted to output the pre-processed conversation.

Preferably, the toy, or conversation engine, is adapted to utilise the parameters of the other toys present in the established network as a variable when constructing the conversation.

Preferably, the toy, or conversation engine, is adapted to output data in dependence on weightings.

Preferably, the toy is adapted to store a plurality of sets of themed data. The toy is preferably further adapted to utilise at least two of the plurality of sets of themed data during a single conversation.

Preferably, the toy is adapted to enable a network to be established with a plurality of other such toys, preferably, 2, 3, 4 or more.

Preferably, the toy is adapted to be animate.

Preferably, the toy is adapted to communicate with other such toys, and said communication includes, speech, actions, and gestures.

Preferably, the toy or conversation engine has one, some, or all of the following features in any combination:
Child can play interactively with the toys
Conversation constructed on-the-fly
Conversation is pre-processed prior to starting the conversation
Conversation is based on the dolls present in the network
Conversation is based on the type of doll present in the network
Weightings used to control the conversation length and direction
Ability to switch between themes mid conversation
Two, three or more toys
Toys are animate/human/dolls
Interaction includes communication; communication is defined in a broad sense In summary, the present invention refers amongst others to the following inventions:

Authoring tool—provides the facility for inputting conversation data to be compiled into program code readable by the toys.

USB communications dongle—provides a device for enabling communication between a toy and a PC.

Controller doll—more than two dolls, control is conducted using as a single controller the first doll that is switched on.

Expression of personality—same theme has different expression based on the personality factor of the doll.

Scripting themes—themes are a downloadable combination of expression and script/script and expression are integral/different script for each different theme.

Parameter storage—capability of storing information relevant to the current conversation, e.g. in the phrase "My dog is called Fluffy" the doll stores the information (pet="dog" and name of pet="fluffy") for use later in that conversation.

Doll specific downloads—website download only has as expression the specific language relevant to the given personality/expression is downloaded according to personality Construction of conversations—dolls choose either to respond with relevant speech, select another doll and address them, or announce something about themselves.

Doll choice—controller decides which doll speaks next randomly; select randomly but no doll can speak twice in a row, or select a specific doll by name.

Game playing—dolls play games as if humans.

The invention also provides a computer program and a computer program product comprising software code adapted, when executed on a data processing apparatus, to perform any of the methods described herein, including any or all of their component steps.

The invention also provides a computer program and a computer program product comprising software code which, when executed on a data processing apparatus, comprises any of the apparatus features described herein.

The invention also provides a computer program and a computer program product having an operating system which supports a computer program for carrying out any of the methods described herein and/or for embodying any of the apparatus features described herein.

The invention also provides a computer readable medium having stored thereon the computer program as aforesaid.

The invention also provides a signal carrying the computer program as aforesaid, and a method of transmitting such a signal.

The invention extends to methods and/or apparatus substantially as herein described with reference to the accompanying drawings.

Apparatus and method features may be interchanged as appropriate, and may be provided independently one of another. Any feature in one aspect of the invention may be applied to other aspects of the invention, in any appropriate combination; equally, any feature in one invention may be applied to any other invention, in any appropriate combination. For example, method aspects may be applied to apparatus aspects, and vice versa. Again, for example, any "Controller doll" feature may be applied to any "Parameter storage" feature.

Furthermore, features implemented in hardware may be implemented in software, and vice versa. Any reference to software and hardware features herein should be construed accordingly.

Herein, any use of the term "means for" plus a function may be replaced by the appropriate hardware component (for example a processor and/or memory) adapted to perform that function.

BRIEF DESCRIPTION OF THE DRAWINGS

Embodiments of this invention will now be described, by way of example only, with reference to the accompanying drawings, of which:

FIG. 12b shows a theme generation window;

FIG. 12c shows a populated theme generation window;

DETAILED DESCRIPTION

Figure 1:
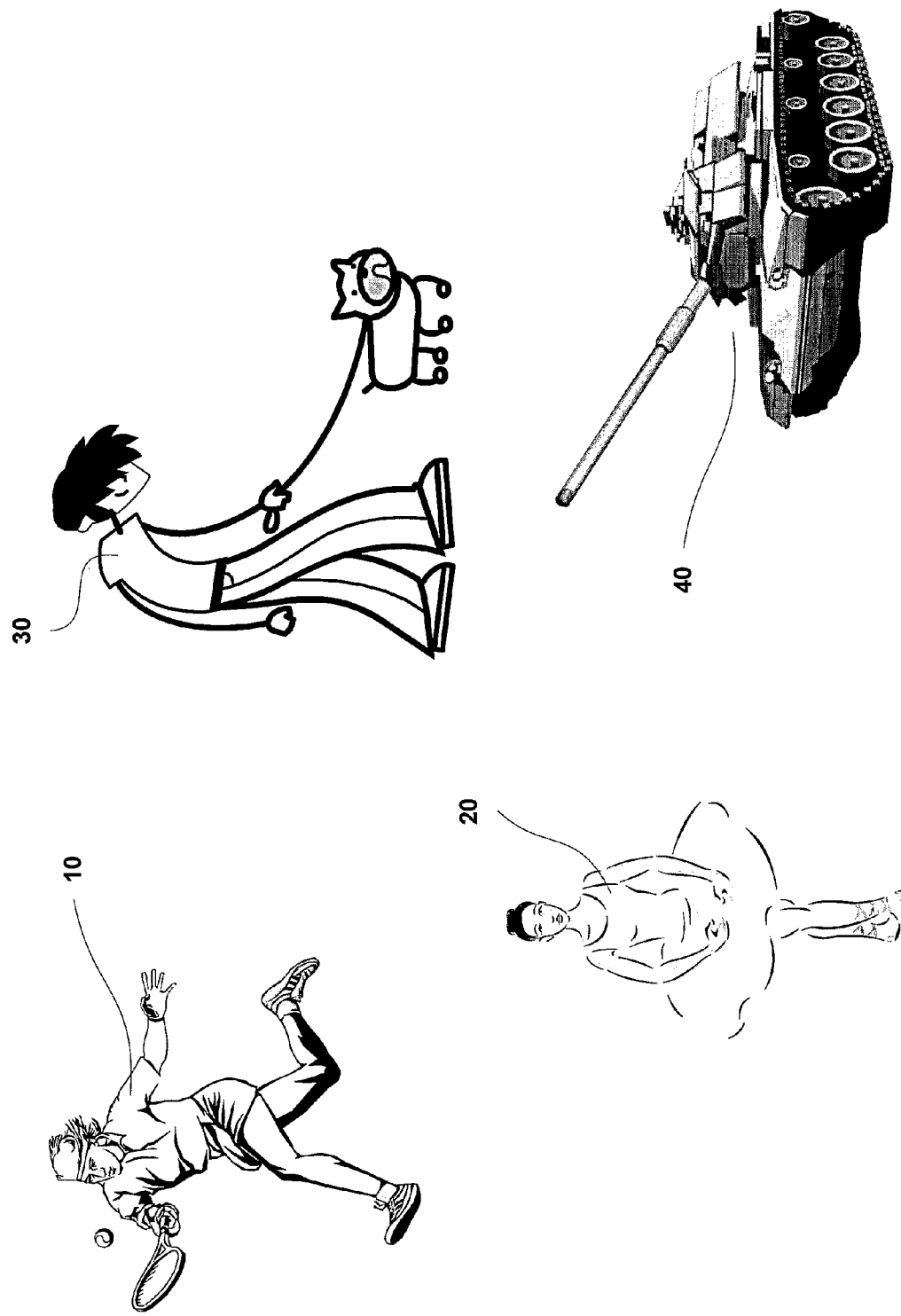
FIG. 1 shows three types of doll.

FIG. 1 shows three types of toy doll; 10 is a tennis playing doll, 20 is a ballerina doll, 30 is a generic doll shown walking a dog, and 40 is a toy in the form of a tank. In general the toys are adapted to appear animate and in particular human, or human controlled in the case of the tank and the like. The four toys shown are examples of types of themed toys. The toys are adapted to communicate wirelessly with other such toys within the theme.

The following description relates to a toy, such as a toy doll, that is enabled to communicate with other such toys; the dolls are adapted to coordinate the speech between the dolls. In another embodiment the toy is a tank or another such vehicle; again, the tanks are adapted to communicate wirelessly with other such tanks to coordinate the behaviour of the tanks instead of the speech between the dolls.

Figure 2:
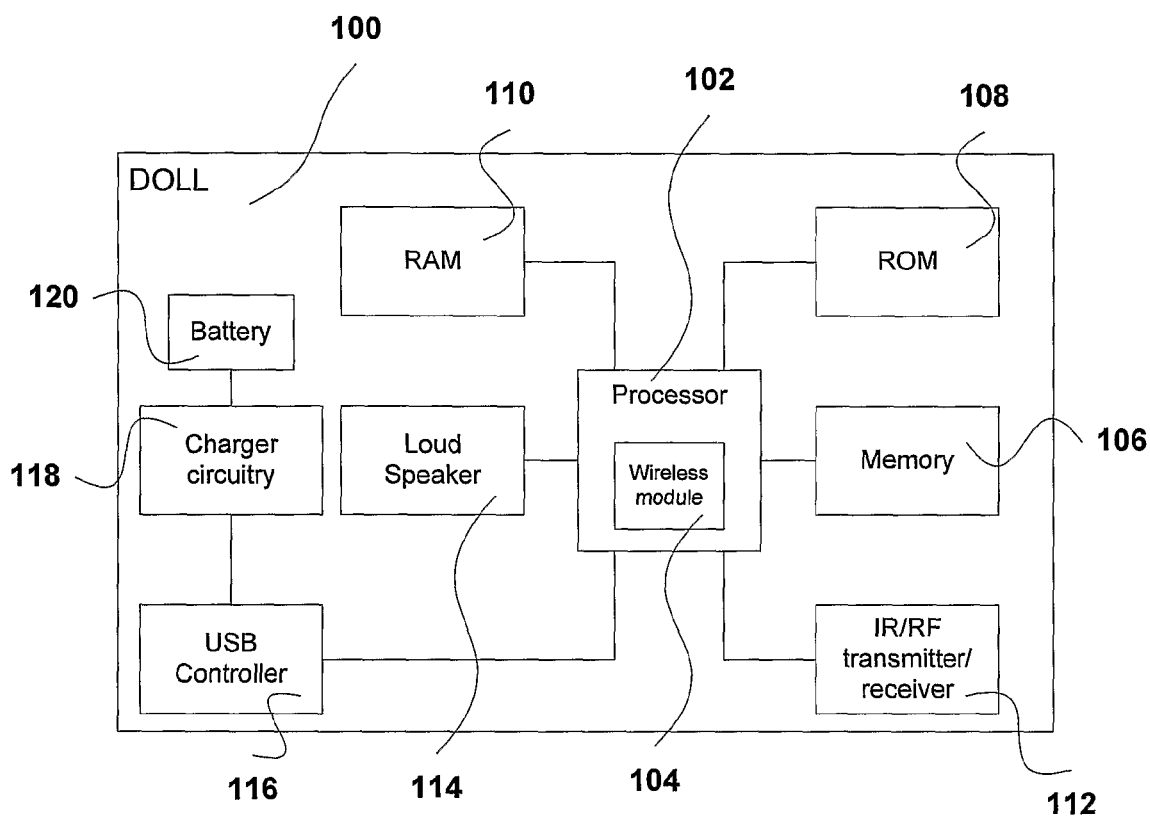
FIG. 2 is a schematic illustration of a doll.

FIG. 2 shows a schematic representation of the doll, with the hardware components required to allow the doll to communicate, and perform other such tasks. The doll 100, as shown in FIG. 2, comprises a processor 102 that includes a wireless module 104. The processor is in communication with memory 106, ROM 108, and RAM 110. An IR/RF transmitter/receiver is connected to the processor/wireless module and is enabled to transmit/receive signals to/from other such dolls. The doll is also connected to a loud speaker 114. A USB controller 116 is used to update the memory 106, and also to charge, via the charger circuitry 118, the battery 120. Alternatively, the doll is adapted to use replaceable batteries, rather than rechargeable batteries.

The memory 106 stores information relating to conversations that the dolls can have, and is accessed by the processor when it is compiling speech. The ROM 108 is used to store permanent information relating to the doll, such as the doll's name and ID number. This information is used in the initialisation procedure when setting up a network of dolls. The RAM 110 stores information relating to the current conversation and is used in order to produce more realistic conversation by storing information relating to the phrases already used for example.

Each doll 100 contains in memory 106: a data set containing the doll's name, and other variables defined during a conversation; a set of instructions which produces the conversation; and a set of audio data. The variables defined during the conversation are only stored in the controller doll.

In one embodiment the processor is in the form as used in MP3 decoding, with the associated memory interfaces (such as SD cards). This embodiment provides a significant amount of processing power (and hardware based compression technology) and would therefore allow for long and detailed conversations between the dolls.

Controller Doll

Figure 3:
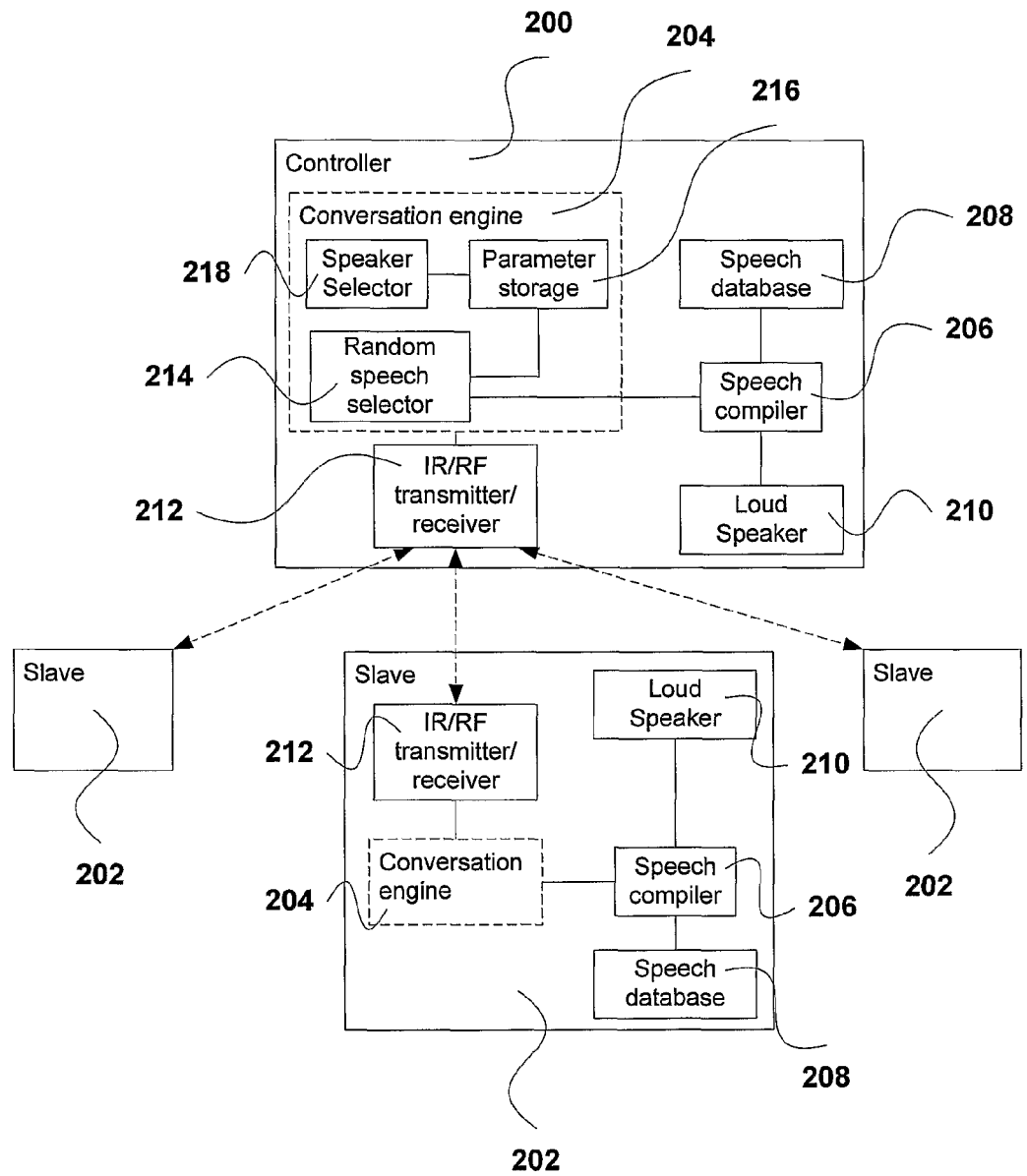
FIG. 3 is a schematic illustration of a controller toy, with slave toys.

As can be seen in FIG. 3 the controller unit, 200, is in communication with a number of slave units, 202. The controller includes a conversation engine 204, a speech compiler 206, a speech database 208, a loudspeaker (transducer) 210, a transmitter/receiver 212 capable of transmitting and receiving data from the slave units. The conversation engine comprises a random speech selector 214, a parameter storage memory 216 and a speaker selector 218. The slave unit has all of the components of the controller unit; not all of the slave unit's components are shown in FIG. 3.

The first unit to be powered on is initialised to be the controller unit. When a unit is powered on it searches for an existing network, and when no network exists it creates a network and waits for other units to join the network. When further units are turned on they join the network and are initialised as slave units. The controller unit awaits communications from both new units indicating they require the network details, and conversation initiation messages. The slave units, once they have joined the network, await instructions from the controller unit. It should be understood that all of the units (toys/dolls) are identical in as far as they are all able to become the controller unit, or a slave unit.

The units are adapted to communicate within themes, such as "The Zoo", "Sport", "Gangsta" or "Fashion". Themes allow the units to have detailed conversations without requiring extremely large databases of information relating to all of the possible conversation topics. The themes/sub-themes can be downloaded to the units by the user from a website.

The following process is used to initiate a network of toys:

When a doll is turned on it performs a check to determine whether there is an existing network to join—this is accomplished using the transmitter/receiver 212.

If there is not a network available then that doll becomes the controller, and automatically sets up a network—the wireless module 104 is adapted to create a network where necessary.

Each subsequent doll that is turned on transmits a doll ID number and theme/themes ID number that they have stored in memory—the information is transmitted via the transmitter 212.

The controller checks the theme/themes and only allows dolls with the same theme/themes as the controller to join—the controller unit performs a comparison of the transmitted data with the data is has stored in memory.

Once two or more dolls have joined the network it is possible to initiate a conversation The user initiates the conversation by pressing a button or the like, and the controller starts a conversation instructing the other dolls what to say The user can press the button again to stop the conversation at any point The controller unit runs the program to generate conversations and then transmits information to the slave units to inform them which audio files to access (the audio files can be different for each personality type, but the reference to each of the audio files is the same for each unit). The controller unit transmits the identifiers of the words/phrases to access from the slave unit's memory. The slave unit acknowledges receipt of the message by transmitting a message verifying the phrase to be used, and the expected length of time required to say the phrase. The slave unit then uses the speech compiler to compile the words/phrases and then uses the loudspeaker to say the phrase. Once the slave unit has finished saying the phrase it transmits a signal to the controller unit that it has finished and the conversation can carry on.

The controller unit then instructs the next speaker in the same way, and so on until the conversation comes to an end. Further detail regarding conversation construction is provided below.

Communication Protocol

The toys communicate using a communication protocol; the format of the messages is as follows:

[MessageID, SendingToy_ID, ReceivingToy_ID, MessageType, Parameters]

The MessageID is a unique number identifying the message. Each message sent from the controller toy has a unique identifying number.

The SendingToy_ID indicates the toy sending the message.

The ReceivingToy_ID indicates the toy that is to receive the message.

The MessageType indicates the type of message e.g. START, STOP, SAY.

The Parameters are any other required information related to the message type. Only the SAY message has a parameter, which identifies the phrase(s) to be spoken.

Therefore, the range of messages comprises:
[MessageID, SendingToy_ID, ReceivingToy_ID, START]
[MessageID, SendingToy_ID, ReceivingToy_ID, STOP]
[MessageID, SendingToy_ID, ReceivingToy_ID, SAY, PhraseID]

Each of these messages will produce an acknowledgement of the following form:

[MessageID, SendingToy_ID, ReceivingToy_ID, Ack, Parameter]

The parameter is only used for acknowledging the SAY message and it specifies the duration of the phrase. The controller unit uses the duration of phrase parameter to wait for the appropriate length of time before sending the next message.

So the normal sequence of events for each message, assuming Toy 1 is communicating with Toy 2, is as follows:

| | |
|---|---|
| [MessageID, 1, 2, START] | [MessageID, 2, 1, ACK] |
| [MessageID, 1, 2, SAY, PhraseID] | [MessageID, 2, 1, ACK, DURATION] |
| [MessageID, 1, 2, STOP] | [MessageID, 2, 1, ACK] |

The START command instructs the receiving toy to expect to receive further incoming messages. The controller doll then sends at least one message containing the phraseID of the phrase that the slave toy is required to use. Each phraseID is sent separately to the slave toy, and so multiple messages of this type may be sent to build up an entire sentence. The STOP command is used to instruct that slave toy that there are no further messages in that sequence.

The slave toy, upon receipt of a message, sends a message to the controller acknowledging the receipt of the message. The controller continues with the conversation program immediately for the START and STOP acknowledgements; however, for the SAY command the controller doll continues after a delay equal to the DURATION for the SAY acknowledgement. If the acknowledgement is not received then the message is resent until an acknowledgment is received. This resending happens a large number of times at which point the dolls will reset and the conversation will stop; for example, the message is resent between 1,000-2000, 2000-5000, 5000-10,000 times, or more.

An "end of phrase flag" is also attached to the end of each phrase to inform the slave unit when the phrase has finished. At this point the slave unit will transmit a message to the controller indicating that it has finished speaking. Upon receipt of the message the controller instructs the next unit to speak, the next speaker may be the controller or another slave unit.

Alternatively to instructing speech, when the controller toy is a tank the instructions communicated to the slave units take the form of directions that the slave unit tanks should move in. Therefore, the PhraseID would be replaced with a movementID. In this way the controller tank would simulate a battle or the like. The toy tanks are provided with means to locate the other toy tanks in the network so that they may move in a coordinated manner. The means can take the form of a playing board with position sensors that the toys are in communication with, or other means of location such as a camera, transponders or the like.

Conversation Construction

The conversation engine constructs the conversation on the fly. Alternatively, before initiating the conversation the entire conversation is constructed and then stored in memory and effectively the conversation is then run through until the end. However, in both cases the conversation constructed will be based on certain random choices.

The conversation is based on the units present in the network, and therefore the number of units present, and the type of units present, are used as control variables. The start of each conversation is fixed, such as for when the toys are dolls "Wow, we're at the Zoo what shall we do now?". But there are multiple starting phrases. The conversation will then be randomly chosen from that point on. The controller unit selects the first unit to speak and then branches at random to any of the starting phrases.

The system is enabled to use an instruction set comprising a number of different types of commands as follows:
  Definition of variables and variable setting
  Context reference and switching
  Conditional flow control
  Unconditional flow control
  Uttering phrases A number of statements are defined to control the flow of the conversation and are as follows:
  SELECT NEXT—selects the next unit to speak. There are a number of variations of this statement that will be discussed in further detail below.
  SWITCH—switches to next unit.
    switch speaker—moves the speaker pointers to another speaker
    switch finish—this statement is used to finish the conversation
  SAY—instructs the unit to say something.
  SET—this statement is used to set a variable, such as "SET pet ([1,dog])". The SET statement is used to set a variable of the current speaker, or it can be used to set a global variable.
  TEST—this statement is used to test whether a variable has been set, or if a branch has been used for example. If the TEST is true a flag is set. There are two forms of the TEST statement:
    TEST EQ—this statement tests whether the two expressions are equal and will produce a positive flag if they are; for example, "TEST EQ &ME.PET &UNDEF"

will test whether the current speaker's pet variable is undefined and will produce a positive flag if it is.

TEST NE—this statement tests whether the two expressions are not equal, and will produce a positive flag if they are not equal.

BRANCH—this statement is used to branch off into another section of the conversation. For example, "BRANCH Gorillas:" would branch off into the Gorillas section of the "Zoo" theme; where "Gorillas:" is a label to a section of the theme. This is an unconditional statement and is always used when the program reaches a branch statement.

BRANCH_F—conditionally branches on a flag from TEST. Therefore, only when the flag produced from the TEST statement is positive will the branch statement be used.

CHOOSE—this statement enables the controller to randomly select a label to proceed to. This statement is similar to the SET statement in that weights can be used to control the probability of proceeding to a label.

CHOOSE_F—conditionally chooses based on a flag from TEST

The audio files are stored in a cropped form to reduce the storage requirements, i.e. there is no silence before or after each audio segment. To produce more realistic speech a number of silent audio files are provided of differing length that can be placed after the cropped audio files, between each phrase or word. These audio files are referenced in the same way as any of the other audio files by the SAY statement.

Variables can be defined, by the SET statement, to store parameters associated with each of the dolls; this is discussed in further detail below. There are two types of variables that can be defined:

Local variables—These are variables that are associated with each Toy/Doll. The local variables are created within each Doll's data set. Doll variables are created by the DEFINE VARIABLE_NAME statement.

Global variables—These are variables that are associated with the "theme" and not with each Doll. Global variables are created by the DEFINE G_VARIABLE_NAME statement.

The variables defined within the theme do not have a value assigned to them until a value is assigned during the conversation.

Setting Values to Variables

During the conversation it is necessary to set values to the variables that have been defined. This is accomplished with the SET statement. The SET statement consists of a random feature that allows the variable to be set with a value taken at random from a set of values as follows:

SET VARIABLE_NAME ([w1,value1], [w2,value2], . . . , [wn,valuen])

The operation of this statement is to set the value of VARIABLE_NAME to one of value1, value2, . . . , valuen based on the outcome of a random number. The probability of which value is chosen is based on the weights w1, w2, . . . , wn.

For example the statement

SET COLOUR ([1,red],[1,blue],[1,green])

Will set the variable COLOUR to red, blue or green with equal probability. Doll variables are set in the context of the current Doll.

Additionally the SET_F statement is used to set a variable only when a TEST statement has produced a condition_flag situation. In this case if and only if the condition_flag is active the variable is set.

Context Reference and Switching

Pointers are used to store information relating to the speakers, and to enable the controller doll to reference other dolls. When constructing conversations these are used to create sensible conversations; the following are the pointers used:

Previous speaker (PREV)=the ID number of the previous speaker current speaker (ME)=the ID number of the current toy next speaker (NEXT)=the ID number of the chosen next speaker An important feature of the Doll's conversation engine is the context of which Doll is the current speaker. The context refers to the variables that the current doll has access to. Only the previous, next and current doll's variables are available for access. The concept of context is handled by three reference pointers, as defined above.

Control of context is achieved by use of the SELECT commands and the SWITCH command. There are a number of variations of the SELECT command. These are:

SELECT NOTME—This selects the next speaker to be any of the group of Dolls chosen at random except the current Doll.

SELECT NEXT—This selects the next speaker to be any of the group of Dolls chosen at random.

SELECT PREV—This selects the next speaker to be the same as the previous speaker.

SELECT NAME—This selects the Doll with the name NAME to be the next speaker. This variation of the SELECT command is for fully scripted conversations.

The context is then changed by use of the SWITCH command. There are two variations of the SWITCH command:

SWITCH SPEAKER label—This switches the speaker context and branches to the instruction specified by the label. On switching context the previous speaker (PREV) becomes equal to the current speaker (ME), the current speaker (ME) becomes equal to the next speaker (NEXT), and the next speaker (NEXT) is undefined.

SWITCH FINISH—This is the command used to end a conversation

Conditional Flow Control

At times during the conversation the flow will depend on the values of various variables. This is accomplished with the following commands:

TEST EQ value1 value2—This sets a condition_flag if value1 equals value2.

TEST NE value1 value2—This sets a condition_flag if value1 is not equal to value2.

Variables can be referenced by value1 and/or value2 by using the &CONTEXT.VARIABLE_NAME reference. For example the instruction TEST EQ &ME.NAME & PREV.NAME sets the condition_flag if the current speaker's (ME) name is the same as the previous speaker's (PREV) name.

BRANCH_F label—This branches to the instruction specified by the label if the condition_flag is set, otherwise the next instruction is used.

CHOOSE_F ([w1,label1], [w2,label2], . . . , [wn,labeln])—If the condition_flag is set this branches to the instruction specified by one of label1, label2, . . . , labeln based on a random selection using the weights w1, w2, . . . , wn, otherwise the next instruction is used.

Each time that a doll requires knowledge of a variable relating to another doll the TEST statement is used to interrogate whether the variable is undefined, or is a specific value. This can then be used for flow control; for example, if the variable PET is undefined then the doll will ask the other doll what type of pet is has, and if the variable is set it will ask the other doll what colour the pet is, and so on.

Unconditional Flow Control

At times it is necessary to be able to change the flow of instructions unconditionally. In this case a TEST statement is not used and the BRANCH or CHOOSE statements are always executed. This is accomplished using the following statements:

BRANCH label—This unconditionally branches to the instruction specified by the label.

CHOOSE ([w1,label1], [w2,label2], . . . , [wn,labeln])— This branches to the instruction specified by one of label1, label2, . . . , labeln based on a random selection using the weights w1, w2, . . . , wn.

Uttering Phrases

An important part of the conversation engine is the uttering of phrases. This is accomplished with the following statement SAY (phrase1, phrase2, . . . , phrasen) command.

This command causes the Doll that is the current speaker (ME) to utter the phrases phrase1, phrase2, . . . , phrasen.

Example Script

The following is a short example of a script.

```
DEFINE COLOUR
DEFINE GARMENT
Loop:
    SET COLOUR ([1,red],[1,blue],[1,green])
    SET GARMENT ([1,dress],[1,blouse],[1,hat])
    SAY (hello my name is, &ME.NAME, and I have a,
    &ME.COLOUR, &ME.GARMENT)
    SELECT NOTME
    SWITCH SPEAKER Loop
```

This example can say nine different things for each Doll present by choosing one of three colours to go with one of three garments.

The conversation is constructed using multiple branches. Each branch is a different area of conversation related to the theme. For example, in the "Zoo" theme the branches available are "Gorillas", "Reptiles" and "Ice cream". Each branch has phrases/words associated with it and they are then chosen randomly from the selection. The doll's responses are dependent on the branch, the doll's personality type, and the weightings of the possible responses.

For example, when a choice is required to determine the next branch to take the conversation will continue until two (or more) dolls choose the same place to go in a row. This provides a more realistic conversation as the agreement is required before choosing a branch to take.

The conversation continues within a branch until a section is reached that enables the controller doll to select another branch to take. At this point another decision is made regarding the branch to take. To limit the length of the conversation only branches that have not been used are available to be selected.

Weightings are attached to each variable that can be chosen randomly, such as Branch, Phrase, Word, or Next speaker. When the phrase/word or branch etc is chosen randomly the weightings alter the probability that that phrase/word branch, etc, is chosen. For example, if all of the phrases had a weighting of 1 then they would all have the same probability of being chosen. The weightings can be adjusted to produce conversations that are more life like. Phrases such as "I fell off my bike today" are far less likely to arise than phrases such as "I had breakfast this morning". As a result the latter phrase would have a far greater weighting than the former. Therefore, only occasionally the conversation engine would result in a unit saying "I fell off my bike this morning".

In a further example, the weightings used can be preferential to the previous doll and will therefore induce mini conversations between two dolls.

In order to limit the conversation length the amount of time within any one branch of the theme is controlled. This can be used as another weighting parameter to reduce the time spent in one branch and increase the amount of time spent in another branch for example. This aids in reaching an end to the conversation without the possibility of the continuing indefinitely.

The length of the conversation may be random; however, in some cases the conversation will continue until all of the variables have been set. For example, in the PET theme the conversation will continue until all of the dolls' pets have been fully described. This is accomplished by performing a check to determine whether all of the variables are defined, and only allowing the conversation to end if they are all defined.

As the current speaker only has the context of the previous speaker and the next speaker it is not always possible to determine when all of the dolls' variables have been set. Therefore, in another example the conversation will continue until all of the variables have been set for all three dolls in the current context, i.e. the current doll, the previous doll and the next doll. Alternatively, the conversation will continue until all of the variables are known for two, or more, sets of dolls in a row.

The conversation engine can cope with multiple dolls, and potentially multiple dolls of the same type, e.g. 2 Jane dolls. When the network is initialised each doll that joins the network is associated with a network node. The system then references the dolls using the associated network node, and not the name of the doll. This enables multiple dolls with the same name to be referenced without error.

Conversations can also be pre-determined in their entirety and then downloaded directly to the dolls. For example, an episode of The Simpsons™ could be downloaded into a group of The Simpsons™ dolls. Pre-determined conversations enable the doll to have especially lifelike conversations, since they are generated by humans, or alternatively they could be generated by a conversation engine and then edited by humans. The same instructions are used when producing a pre-determined conversation; however, the random elements are removed such that the conversation is the same every time it is activated.

The above conversation engine could be used independently to generate conversations. For example, it could be used for automated script writing for a television show, such as a cartoon.

In one particular embodiment, to generate the themes the theme is scripted, and then a compiler is used to compile the script. A run-time error check is performed to ensure that the theme does not produce never ending conversations or any other errors, and then a sanity check is performed to ensure that the conversations are not completely nonsensical. The theme is then able to be downloaded to the toy once the audio files have been recorded. In an alternative embodiment, described in further detail below, there is provided an authoring tool to simplify the generation of theme scripts. However, the basic principles of the conversations within the themes still apply. For example, the same methods of choosing what to say are present in both embodiments.

Doll Choice

As shown in FIG. 3, the conversation engine has a speaker selector 218. The speaker selector selects the next toy to speak. There are three possibilities for choosing the next toy to speak: choose at random any of the toys within the network; choose a toy by name (ID number); and choose the current speaker to speak again. Therefore, the first process in choosing the next speaker is to select, at random, which one of the above three possibilities to use. When choosing the next speaker by name, a check must be performed to determine that the toy is in the network.

As described above the select statement chooses who will speak next. When deciding on the next speaker the options are to respond with relevant speech, select another doll and address them, or announce something about the current speaker.

The SELECT statement is used within the speaker selector 218 to initiate the random selection of the next speaker. Alternatively, the SELECT statement can use logic to determine the reference to the next speaker. For example, if the next doll chosen to speak is Jane, then the current speaker can ask the following question "Jane, what is your favourite pet?". Jane is set as the next speaker and so the reply will come from Jane. As can be seen in the examples below the & statement can be used to reference the next speaker, or any other general parameter without knowing the specific parameter. For example, &NEXT.NAME references the next speakers variable NAME, and can be used to say the next speakers name.

Further options are available such as no doll can speak twice in a row, so for example if Jane announces that she has a pet dog, then Jane would not be selected to speak again directly afterwards.

Similar methods are utilised by the authoring tool to choose the next doll to speak, this will be described in further detail below.

Parameter Storage

The parameter storage memory 216 stores information relating to the current conversation. The information stored includes: the phrases that have already been used; the variables that have been used; flow control variables; and other such information like the dolls that are in the network. The information is only stored within the controller doll. The slave unit only receives information relating to the next thing to say.

The variables that have been used in the conversation are stored so that they may be referred to later in the conversation. Variables are pieces of information describing the doll, and are used to differentiate the characters. For example, the information stored from the phrase "My dog is called Fluffy" would be the information, dog and fluffy. This variable can be used to set the type of pet that a doll has. The variables can be set so that dolls can only have a certain sub-set of the variable. For example, girl dolls can not have a snake as a pet.

Flow control variables, are used to store information regarding the branches that have already been used. For example, a branch may be going to see the Gorillas when at the Zoo. This piece of information will be stored so that the conversation does not return to the Zoo.

Alternatively, the phrases that have already been used are stored so that the conversation does not go on forever. Limits can be set on the number of times a particular word/phrase can be used within a single conversation; this limit may be 1, 2, 3 or more. This ensures that the conversation does not become too repetitive.

There are also global variables that can be set and are stored within the parameter storage memory. An example of a global variable would be anything that affects all of the dolls within the network, for example "it's raining outside", or the places that the doll's have been within the conversation. A global variable can be accessed independently of the context of the doll, and so can be used at any point in the theme.

Parameters are also defined using the authoring tool to store attributes relating to the theme/doll, this will be described in further detail below. In brief, theme attributes/global variables store parameters associated with the entire theme and can be accessed by any doll at any time, and doll attributes/local variables store parameters associated with each doll and are only accessible by the previous/current/next doll.

Doll Specific Downloads

Figure 4:
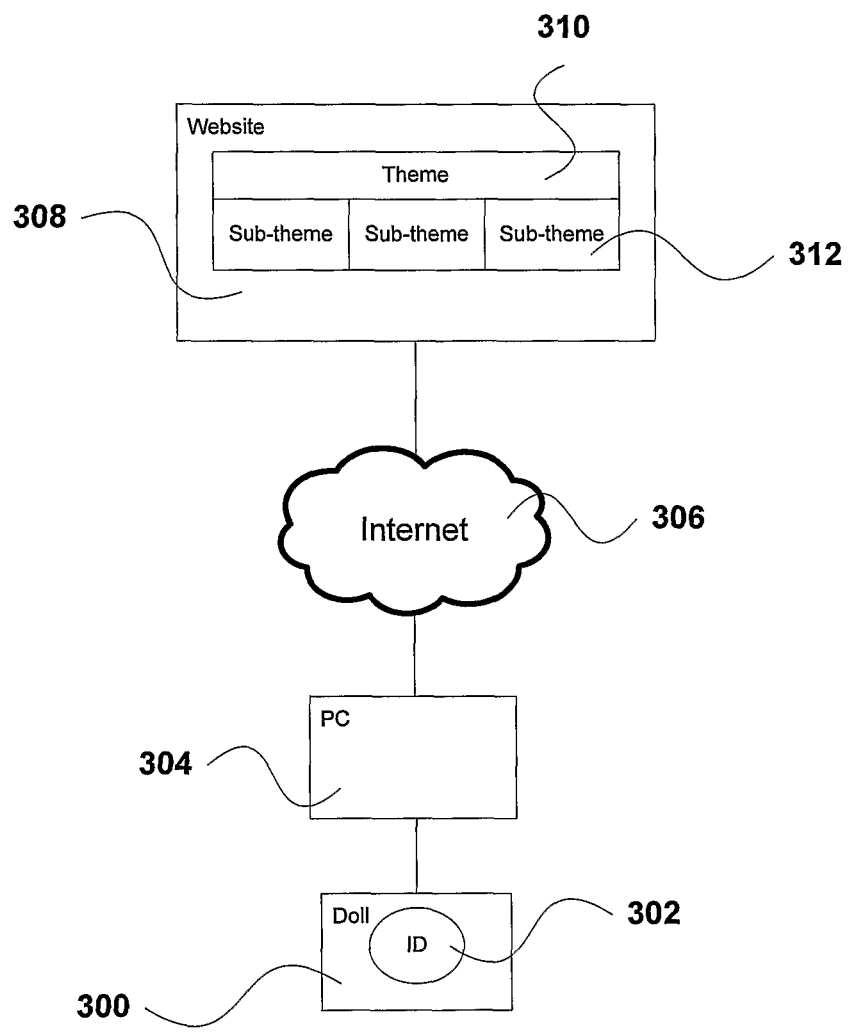
FIG. 4 is a schematic illustration of a doll connected to a website enabled to download themes/sub-themes to the doll.

FIG. 4 shows a schematic illustration of the process through which a doll can change, or update, the theme that it has stored in memory. The doll 300 contains an ID number 302 which is used to identify the doll. The doll is connected to a PC 304 via a USB connection, and the PC is in turn connected to the Internet 306 via a standard connection type. The Internet provides the PC with a connection to the Website 308 that contains downloadable themes 310. The themes contain sub-themes 312 that are not selectable by the user as they are dependent on the doll connected. For example, a Jack doll—identified using the doll's ID number—would not be presented with a Jill sub-theme. The themes are generic to all of the personality types. The sub-themes are identical to the main theme, except that the expression of the theme is different and dependent on the personality type of the doll. The audio files are therefore different for each sub-theme—different voice, different wording (same meaning), etc.

Alternatively, the first personality downloaded into the doll can be used to restrict the subsequent downloaded personalities to be the same as the first type. For example, if the doll is set up to be Jack, the website will recognise the Jack sub-theme when the doll is connected, and only present the user with Jack sub-themes. The website recognises the sub-theme by accessing the doll's name variable, i.e. Jack, and comparing it to the list of names of sub-themes.

The downloaded sub-theme includes the script for the theme chosen, such as "The Zoo", the associated personality type, the corresponding audio files that enable the doll to vocalise the conversation, and a theme ID which is used to ensure all of the dolls within a network have the same theme.

The PC 304 is adapted to interface between the doll 300 and the website 310 to enable the theme to be downloaded in an efficient manner. Furthermore the theme is only stored on the doll and therefore each doll that requires the theme must be connected to the website. Therefore, if one user has two dolls and requires the same theme for each doll the user must connect to the website with each doll, and download the appropriate sub-theme.

Alternatively, the doll can store multiple themes at any one time. The doll communicates using one theme at a time; however, the themes could be changed—by the controller—at any time. Therefore, the dolls could use the "Sport" theme and then progress onto using the "Zoo" theme. This enables the conversation to continue for longer and provides further combinations to extend the usability of the dolls.

The dolls all have a default theme so that they may communicate briefly when they do not have the same theme as other dolls. The default theme contains a few basic phrases, and may direct the user to connect to the website to download a theme.

To ensure the themes are secure the data can be encrypted, using the doll's unique ID number before being downloaded to the doll. Each doll's unique ID number can then be used to decrypt the data within a theme. This can be used to ensure that every doll connects to the website to download the theme. For example, even though each Jane doll would use the same sub-theme the data would be encoded differently for each specific doll, and is therefore effectively useless other then for that specific doll.

Expression of Personality and Scripting Themes

As mentioned previously, each different theme has various sub-themes that enable different personalities to be expressed. The script for every theme is different and is used to generate conversations according to that theme. However, each sub-theme within every theme has the same script to generate the conversations, but the language used in the sub-theme is different. This enables multiple personalities to be available for the same theme.

To increase the variability of the conversations there are multiple random choices available to ask the same questions. So for example there are multiple ways of asking a simple question, and this may be dependent of the themes/sub-themes for example: "What shall we do next?"; "What are we going to do now?"; or "What's next?". Each sub-theme can have different expressions that are used to mean the same thing. For example, one sub-theme may say "Hello, how are you?", and another says "Hi, how's it going?". The meaning of the phrase is effectively the same but the expression, and therefore the personality, is different. In this way each theme can have any number of sub-themes to create a colourful and interesting conversation. In this way the user experience is enhanced and allows for a more varied game play without the requirement for large amounts of memory.

Personality traits can be attributed to one and the same theme. It is therefore possible to have a Jack version and a Jill version of the same theme. The Jack version is a sub-theme, and the Jill version is a sub-theme.

The name of the doll, i.e. Jane, is linked to the personality type so the personality expressed by the Jane doll will be the same for every theme; only the content of the theme would change. This enables the doll to remain consistent and allow the doll to react in similar ways in different situations.

Alternatively, the user of the doll can select the doll's name and the dolls personality when the doll is first initialised by the website. This enables the user to be more involved with the doll. The doll's name and personality type would then be stored in memory within the doll, each attribute associated with an ID, and used when downloading further sub-themes for example.

The downloadable themes are a combination of the expression and the script and dictate the type of conversation.

The aesthetics and vocabulary of the dolls can also be tailored so that it is age appropriate for a target audience. Various themes may have an age appropriate rating. This allows hip hop themed dolls, for example, for a teenage market.

Furthermore, phrases can be provided that are only allowed to be used by a discrete set of dolls (this may be a single doll). When this phrase is selected a check is performed to ensure that it can be used by the current doll. If it can not be used by that doll then another phrase is selected.

Similarly, sections of the instructions can be restricted to only a discrete set of the dolls to introduce further randomness into the conversations.

Alternatively, the toy is in the form of a tank, or other such toy. The expression of the toy's personality in this case is in the form of movements as opposed to speech. For example, one toy tank could have a "defensive" personality and another toy tank could have an "aggressive" personality.

Authoring Tool

Figure 10:
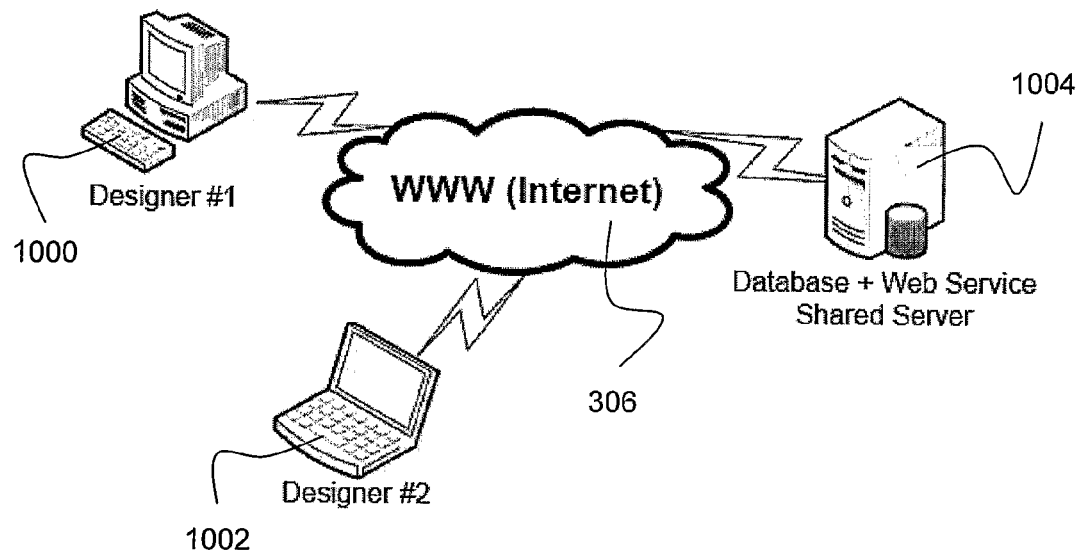
FIG. 10 shows user PCs in communication with an authoring tool server.

The authoring tool is an application which can be used to create conversation themes for multiple dolls. The conversations as described above require a significant amount of time to create due to the large number of potential branches that the conversation can follow. Therefore, in order to make the process more efficient an authoring tool is provided to aid in this process. Although the client application runs on a personal computer or the like, such as PC 1000 or laptop 1002 as shown in FIG. 10, the data is stored on a server 1004 to allow either multiple users to work on the same theme, or for a single user to work on the same theme from different locations. A web service is provided on the server to interface the database with the client application. The client application communicates with the server 1004 via the Internet 306. The client application formats requests to the web service, and hence the database, using XML, and transmits the data using the SOAP protocol.

Overview of the Authoring Tool

Figure 11:
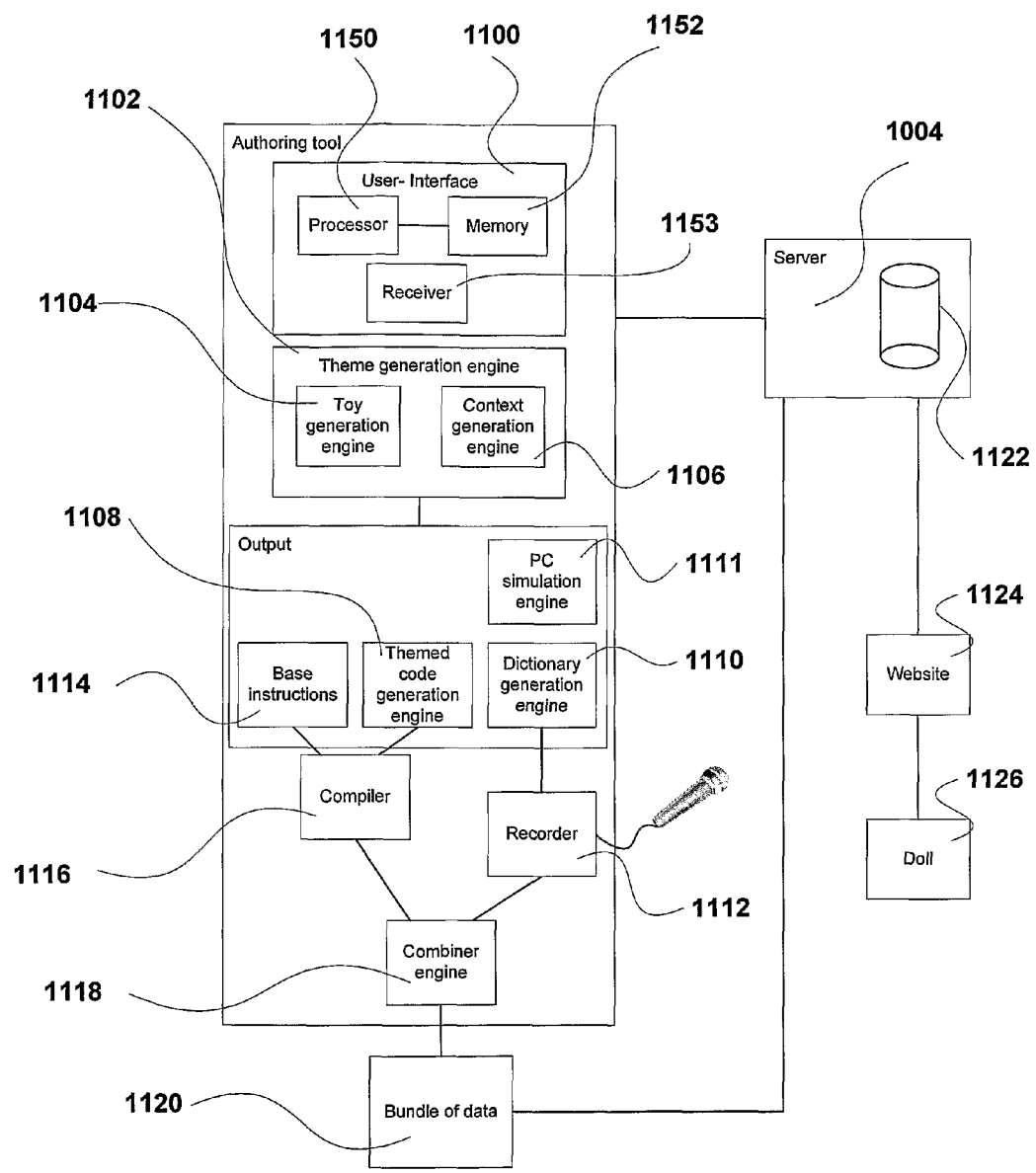
FIG. 11 shows an overview of the authoring tool, and associated systems.

FIG. 11 shows an overview of the authoring tool. A user interface 1100 is provided to allow theme developers to simply and efficiently output themes for toys. Using the user interface provided the developer follows the following steps:

1. Create a theme using a theme generation engine, 1102
2. Create toys for that theme using a toy generation engine, 1104
3. Create multiple contexts for each toy, using a context input window 1106
4. Output the instructions ("C" code), using the code generation engine 1108
5. Output the "dictionary" of phrases to be recorded for each doll, using the dictionary generation engine 1110
6. Output, when required, the theme as a simulation using simulation engine 1111 for use in testing the themes on a PC The term context, as used herein, connotes a sub-set of content within the theme data, e.g. for each position within the themed conversation there is at least one context that determines what the doll says and which doll will speak next. A context can also set theme/doll attributes.

Once the instructions and "dictionary" have been output using the code generation engine and dictionary generation engine 1110 respectively, the phrases are recorded using recording means and audio files are created and saved using the recorder 1112. The recorder prompts an actor to generate each of the expression data required for the particular theme being created. The recorder then allocates each audio file with the ID number corresponding to the appropriate expression data. In use, the audio files are referenced using the appropriate ID number by the code operated by the toy's processor and output using the toy's speaker.

A set of base instructions 1114 (the firmware for the toy's processor) are combined with a set of themed instructions (generated by the code generation engine 1108) and compiled using a compiler 1116 into binary files that are used by the toy's processor to operate the toy according to the theme. In the previous embodiment, described above, the base set of instructions/firmware was located in the toy's processor memory, and only the set of themed instructions, and the audio files, were downloaded to the doll each time the theme was changed or updated.

Once the instructions are compiled they are bundled together with the audio files using the combiner engine 1120 so that they can be downloaded to each doll (each doll has an individual download, comprising the same themed instructions, but with personalised audio files).

The authoring tool has access to the server 1004 and a database 1122, where the themes are stored. The themes are stored in different formats depending on whether they have been finalised by a theme developer. The non-finalised themes are stored such that the information is readily accessible by the authoring tool; this is in the form of a database containing references to the theme name, toy name, contexts, etc. Once the theme developer finalises the theme the theme is also stored as a set of instructions as described above, in addition to the non-finalised format. This enables a finalised theme to be amended, and a new theme created based on a previously finalised theme. A website 1124 is provided that enables the users of the toys to download the themed data to his/her toy/doll 1126.

The authoring tool has several functions including those as described above:

1) It can be used to create and to edit themed conversations for multiple dolls, using the theme generation engine 1102.
2) It can be used to simulate the conversation process, producing a text output of the resultant themed conversation, using the simulation engine 1111.
3) It can be used to assemble a list of all the phrases to be recorded for each doll, using the dictionary generation engine 1110.
4) It can be used to produce "C" code output (sets of instructions), using the code generation engine 1108, which can then be compiled and linked with the modified processor firmware to produce a binary data file for each doll ready for download.

Entering Conversation Data

The authoring tool application user interface is shown in FIGS. 12a to 15. Each window of the interface has numerous navigation buttons to either interface with input windows, or to proceed to the next interface window. The user interface utilises the processor 1150, and associated memory 1152 to display to the theme developer the various aspects of the user interface, and the receiver 1153 to receive the content input by the user. The processor 1150 and memory 1152 are situated within the PC 1000 or laptop 1002. The term content, as used herein, connotes scripting data, expression data, theme data, doll data, and any other data type that may be input by the user into the authoring tool.

Figure 12A:
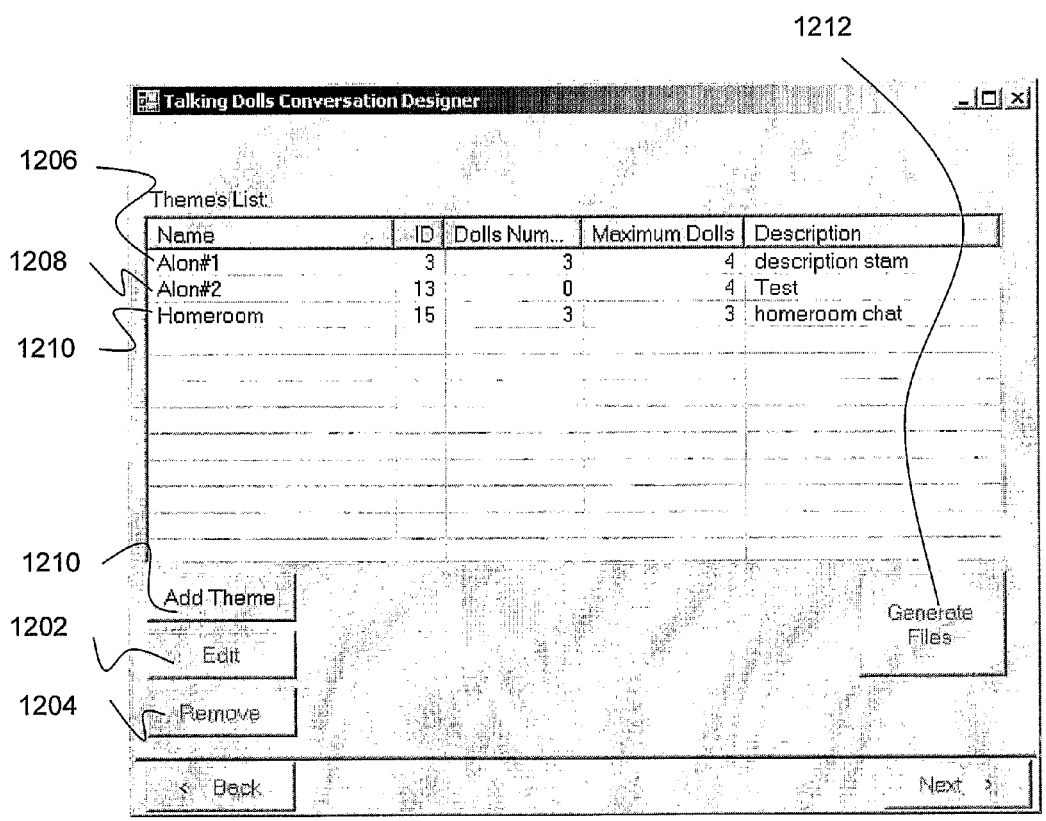
FIG. 12a shows a conversation designer window.
Figures 12B, 12C:
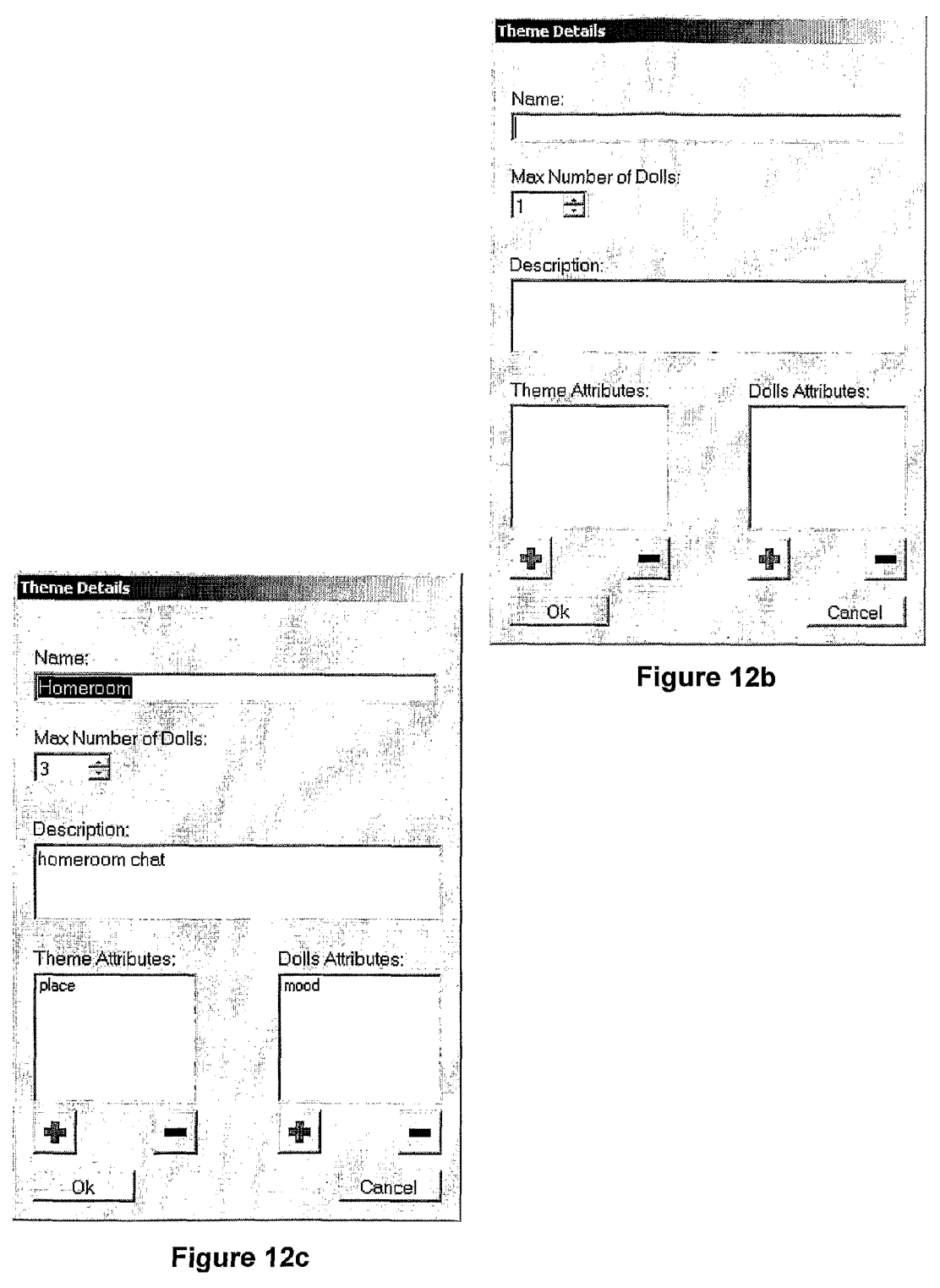

FIG. 12a is the first interface window, and has the following options:

Add Theme, 1100: This is used to create a new theme and is normally the first option used. It brings up a theme form, as shown in FIGS. 12b & 12c, which requires the following inputs:

Name: The name of the theme. This is a place holder for a spoken_text_string

Number of Dolls: The total number of dolls supported in this theme

Description: The description of the theme

Theme attributes: The global attributes of the theme, such as the location

Dolls attributes: The local attributes of the dolls such as a mood

These inputs are equivalent to the inputs required in the construction of conversations as described above. The theme and doll attributes, as described with reference to the authoring tool embodiment, are equivalent to the global and local variables respectively, as described above. However, the authoring tool provides the theme developer with structured input windows to enable the information to be input more efficiently.

In further detail, theme attributes consist of a name and optionally a value. The value can be a placeholder for spoken_text_string. The spoker_text_string is created after the theme has been finalised, as described below. A spoken_text_ string, is a sound file that can be accessed during the conversation. For example, if the theme was located in the Zoo, a possible theme attribute would be location="Zoo", and can be used by the dolls; e.g. to say "Hi, I'm really having fun at the Zoo", where the word "Zoo" was accessed using the theme attribute "location".

The doll attributes are created in the interface window as each doll in a particular theme require a value for an attribute. For example, if the attribute set is "mood", then each doll will be attributed a value for this attribute, such as "happy", "sad", "angry", etc. During the conversation the conversation engine can access any of the doll attributes (local variables) and use it in the conversation Edit, 1202: This is used to edit an existing theme. For example, selecting the theme Alon#1, 1206, and pressing edit will allow the user to edit the details of the Alon#1 theme.

Remove, 1204: This is used to delete the selected theme.

FIG. 12a shows the window after three themes 1208, 1208 and 1210 have been created. It can be seen that each theme shows the overview of the theme's details, including a brief description of the theme, the number of dolls involved in the theme, and its ID number. The information input into the theme form is stored in the database 1122 in the server 1004 for later retrieval when generating the output instructions.

Figure 13A:
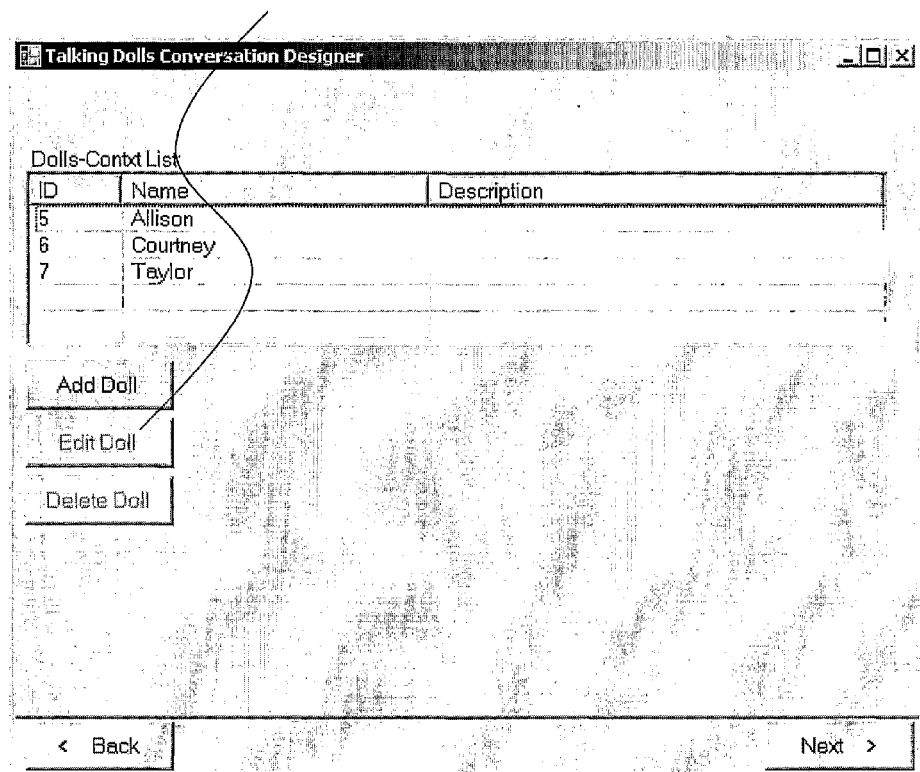
FIG. 13a shows an add doll window.
Figure 13B:
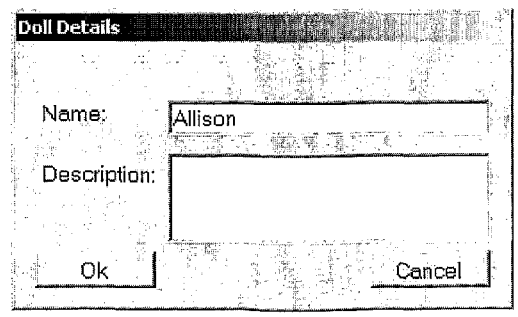
FIG. 13b shows a create doll window.

Once the theme has been created, the user moves on to the next window to create the dolls within the theme. FIG. 13a shows the doll generation window, and when the user presses the "add doll" button 1300, the window shown in FIG. 13b is displayed. This window allows a doll to be created named, and given a brief description.

As many dolls as required can be created using the windows shown in FIGS. 13a & b. However, the number of dolls that can be created is limited by the previously determined maximum number of dolls for that particular theme. Using these same windows it is also possible to edit existing dolls. Each doll created in this way will lead to a sub-theme being generated. The sub-theme, as described above, is the theme for each specific doll. For example, the voice used to record the speech is different for each toy, and the context data will be different. Again, the information input into the doll form is stored in the database 1122 in the server 1004 for later retrieval when generating the output instructions.

Figure 14:
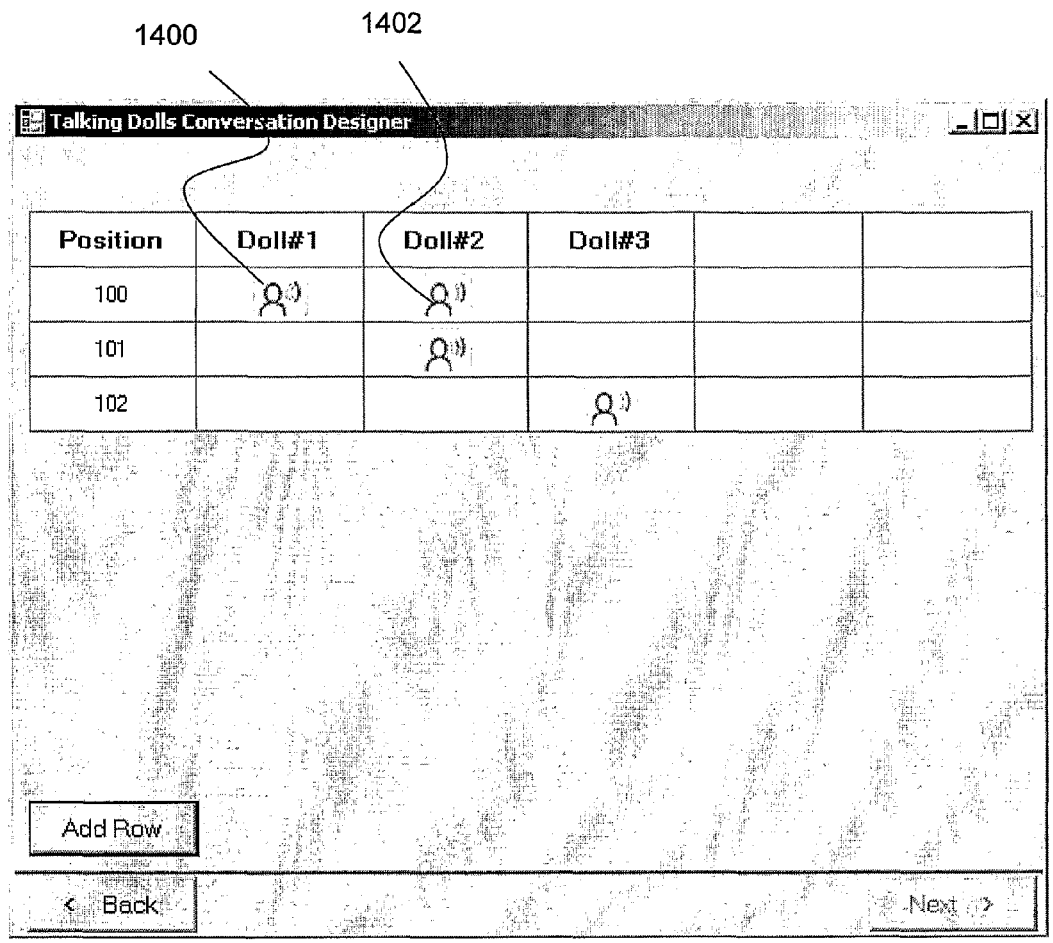
FIG. 14 shows a doll context window.

FIG. 14 shows the context definition window where the different contexts are input against each doll in the theme. As shown in FIG. 14, at Position 100 there are two contexts defined, 1400 and 1402, one for Doll#1 and one for Doll#2. Therefore, when Position 100 is accessed within the conversation, a doll is chosen by a method as described above, and the corresponding context is accessed. Each context holds information relating to what the doll should say, and which doll should speak next. This simplifies the process of conversation construction as described above, by providing the theme developer with a structure for creating the conversation. The theme developer is no longer required to code the theme themselves, rather the authoring tool generates the required code in dependence on the theme developers input.

Figure 15:
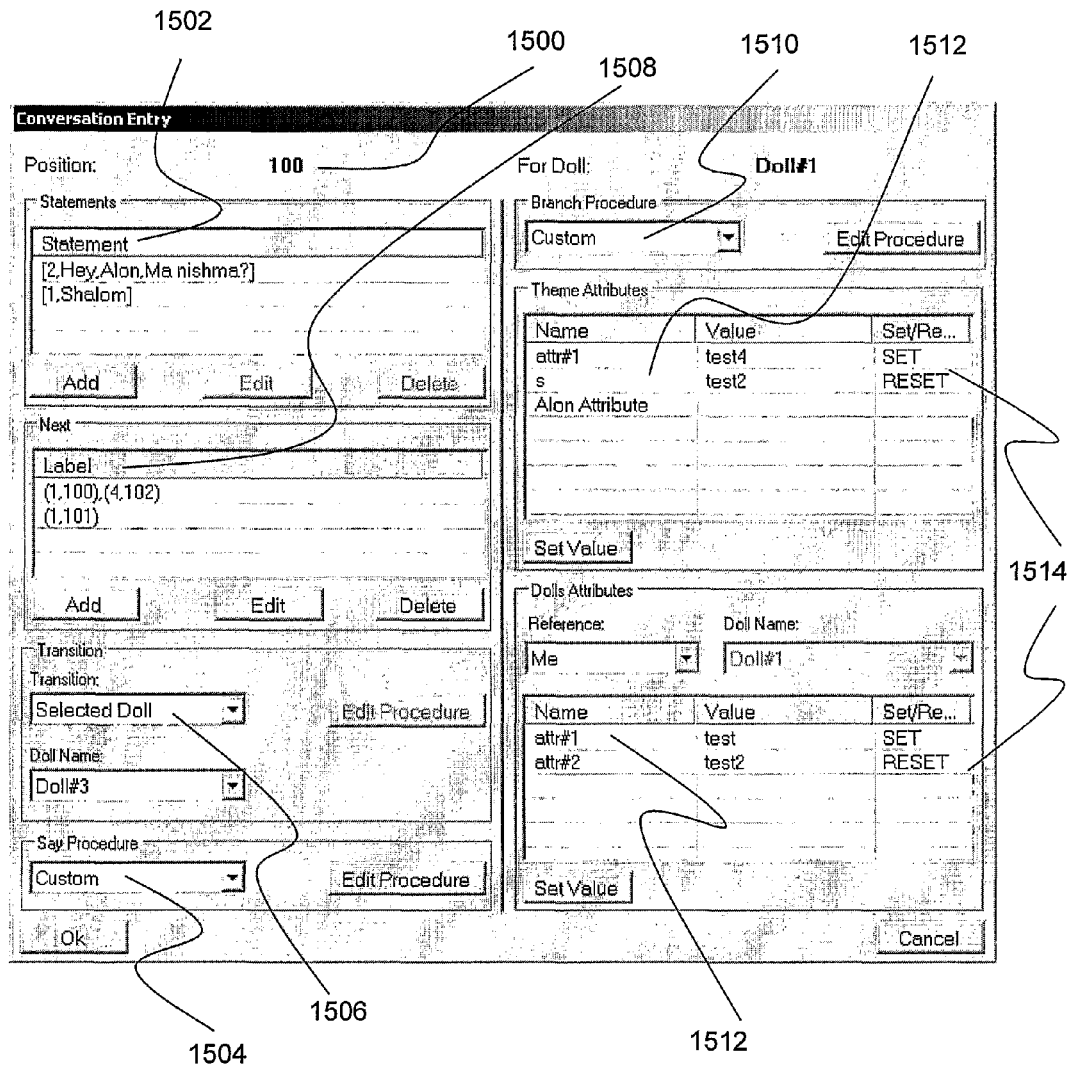
FIG. 15 shows a conversation entry window.

FIG. 15 shows the context generation window for each position within the theme. In the example shown in FIG. 15, this is the context for position 100 and Doll#1. Each context requires the following information:

Position, 1500—A text string labelling this position which is created automatically by the authoring tool when a new context is created in the context definition window shown in FIG. 14. This is a convenient label for each context row. It can be any text; however, the default is to sequentially number the context rows starting at 100. The use of text labels is to aid clarity while creating and editing the conversation. When output of "C" code is required all Position labels are converted to indexes into an array of youme_conversation_struct_t structures (C code naming convention utilised for this and the other structures described herein) which correspond to the context positions.

Statement, 1502—A list of statements that the doll can say together with weightings used in the random selection process. The statements contain a list of phrases which are spoken_text_strings. This is a list of statements that can be said by the particular doll at this context point in the conversation. Each statement is enclosed in square brackets and each statement can either be separated by a comma (e.g. [statement1],[statement2],[statement3]), or entered on a separate line of the context input window as shown in FIG. 15. Statements consist of a weighting, for random selection, and a list of phrases. The weighting in this case operates in a similar manner to the weightings as described above with reference to the conditional flow control, such as the SET, BRANCH or CHOOSE controls. Each phrase is either an explicit spoken_text_string or a reference to a theme attribute or a doll attribute, e.g. the statement can reference to the location of the theme or the mood of the doll. Explicit spokentext_strings are defined as text within double quotes (e.g. "hello how are you"). References take the following forms:
theme.attribute for a theme/global attribute
me.attribute for the current speaker doll attribute
prev.attribute for the previous speaker doll attribute
next.attribute for the next speaker doll attribute
name.attribute for the named doll/local attribute The following are examples of valid input to the Statements field:
Blank—This means there is nothing to say by this doll at this point.
[1,"hello how are you"]—Only one statement specified "hello how are you" will be spoken by this doll at this point.
[1,"hello",prev.name,"how are you"]—Only one statement "hello" followed by the previous speakers name followed by "how are you" will be spoken by this doll at this point.
[1,"hello"],[1,"hi"]—Two statements with equal weighting. If the default_say_procedure is used then "hello" will be said 50% of the time by this doll at this point and "hi" will be said the other 50% of the time.
[3,"hello"],[1,"howdy"]—Two statements with unequal weighting. If the default_say_procedure is used then "hello" will be said 75% of the time by this doll at this point and "howdy" will be said the other 25% of the time.

Say, 1504—The procedure used to say the statements. If left blank then the default_say_procedure is used. The default_say_procedure randomly selects one of the available statements using the weights. Alternatively, any available built in say procedures providing different behaviour can be selected using the drop down list. The say procedures as described above can be provided in the drop down list. Finally, if custom behaviour is required "C" code of the required say procedure can be entered here.

Transition, 1506—The procedure used to select the next doll. It can be any of the procedures described above including: NOTME, ANY, ME, PREV, FINISH or one of the dolls names or some "C" code can be entered here. If left blank the default_transition_procedure is used, which is the NOTME transition. Alternatively, there is a pull down list of available transition procedures. This list consists of the following built in transitions, and is accessed in the authoring tool via a drop down menu (each as described in detail above):
NOTME Selects any doll except the current speaker at random.
ANY Selects any doll at random.
ME Selects the current speaker
PREV Selects the previous speaker
Doll's name Selects that doll
Additionally, if a custom transition behaviour is required "C" code of the required transition procedure can be entered here.

Next, 1508—A list of branch choices of where to go next together with weightings used in the random selection process. This is a list of branch choices for the next context position. Each branch choice is enclosed in square brackets and delimited by commas. Branch choices themselves consist of a list of position labels together with weightings for random selection. They are similar in format to the BRANCH command as described above. The following are examples of valid input to this field (each as described in detail above):
[(1,label1),(1,label2)]—One branch choice containing a choice of two labels with equal weights.
[(1,label1),(1,label2)],[(2,label3),(3,label4)]—Two branch choices, the first containing a choice of two labels with equal weights, the second containing a choice of two labels with weights 2 and 3.

Branch, 1510—The procedure used to effect the branch, and the format is the same as described above with reference to conversation construction. Otherwise some "C" code can be entered here. This field is used to specify the branch procedure to process the branch choices. If left blank then the default_branch_procedure is used. The default_branch_procedure uses the first branch choice in the Next list and chooses one of the labels at random using the provided weightings. The context is then changed to the context row with the chosen label as its position label. Alternatively, there is a pull down list of available built in branch procedures. The branch procedures as described above can be provided in this drop down list.

Attributes, 1512—A list of attributes, a set_flag, and list of values and weightings for random selection. This field is used to specify any attributes to set with values at this context point, i.e. the theme developer can set the doll attribute "mood" to happy. If left blank then no attributes are set. Each attribute to be set is enclosed in square brackets and delimited by commas. Within the square brackets the attribute is specified followed by a set_flag which specifies if the attribute is to be set once or can be reset, followed by a list of values and weightings for random selection. The attributes field is the equivalent of the SET command as described above. The following are valid input to the Attributes field:
Blank No attributes to set
[me.attribute1,set,(1,"hello")] One attribute to be set, if not already set, to the value of spoken_text_string "hello"
[me.attribute1,reset,(1,"hello"),(1,"hi")], [me.attribute2,set,(1,"peter"),(1,"paul")] Two attributes to be set. The first to be set, even if already set, to either "hello" or "hi". The second to be set, if not already set, to either "peter" or "paul".

Set, 1514—The procedure used to effect the setting of attribute values. If left blank then the default_set_procedure is used. The default_set_procedure sets each specified attribute to the appropriate choice of values taking account of the set_flag. A set_flag of "set" means that the attribute can only be set if it has not already been set. A set_flag of "reset" means the attribute can be reset over and over again. Alternatively, there is a pull down list of available built in set procedures. Finally, if some special custom set behaviour is required "C" code of the required set procedure can be entered here.

As described above, the fields, Statements, Say, Transition, Next, Branch, Attributes, and Set are replicated for each doll. The fields Say, Transition, Next and Branch are all parameters that contribute to the method of interaction between the toys/dolls, and are all equivalent to commands as described above with reference to conversation construction.

The Context option is used repeatedly to add context rows to the conversation until the conversation is complete.

When the theme has been completed, including defining each doll, and each context, the authoring tool provides a save function. This option is used to save the conversation, and in one example it creates the following directories:

```
c:\youme\themes\theme_name
c:\youme\themes\theme_name\doll_name - for each doll
c:\youme\themes\theme_name\doll_name\audio - for each doll
```

Therefore, all of the files required for a single theme are saved within the master directory folder "theme_name". Subfolders are created for each doll to enable the downloads for each doll to be managed efficiently. Finally, each doll subfolder has a folder to store the audio files required for that doll.

It also creates the following files:

```
c:\youme\themes\theme_name\theme.txt - containing the theme data as a text file
c:\youme\themes\theme_name\doll_name\doll.txt - containing the doll data as a text file.
c:\youme\themes\theme_name\doll_name\audio\A00001.wav
c:\youme\themes\theme_name\doll_name\audio\A00002.wav
...
...
...
c:\youme\themes\theme_name\doll_name\audio\A00010.wav
...
...
c:\youme\themes\theme_name\doll_name\audio\Annnnn.wav
```

The way files created are place holders for each of the spoken_text_strings defined in the theme for each doll. The spoken_text_strings are assigned file names A0000n.wav in sequence starting from A00001.wav. The n used in the file name is also used as the index to the phrase when output of "C" code is required. The recorder, 1112, in one embodiment, provides a prompt for the actor to enact the required spoken_text_string, and then automatically saves the file with the correct file name before prompting the actor with the next spoken_text_string.

In addition, the authoring tool is adapted to generate "C" code corresponding to the conversation. The majority of the "C" code is predefined (a base set of instructions), and acts as the operating system for the toys/dolls processor. Once the "C" code corresponding to the conversation is output (the themed set of instructions) it is combined with the predefined "C" code, see FIG. 11, and then compiled to create the binary file suitable to operate the processor in the doll, or in the PC. Incorporating the operating system/firmware into the doll each time a new theme is created allows the functionality of the doll to be altered simply and efficiently whenever required.

Two varieties of "C" code can be output:

```
1. "C" code for windows - This "C" code can be saved as:
    c:\youme\themes\theme_name\theme_simulation.c; and
    c:\youme\themes\theme_name\theme_simulation.h
```

This code can be subsequently compiled and linked with a windows based conversation simulation engine The resulting application can be saved as c:\youme\themes\theme_name\simulation.exe. The simulator allows the user to specify which dolls should be considered as present and active. It then simulates an instance of the conversation as it would happen in real dolls. It selects one of the active dolls at random to be the current speaker and processes the first context row for that doll. It then executes each new row in turn outputting which doll is speaking and what they are saying. It continues until the conversation finishes.

2. "C" code for the processor—this code can be subsequently compiled and linked with the modified player to produce binary data files for each doll. These "C" code files can be saved, for each doll, as:

```
c:\youme\themes\theme_name\doll_name\youme_chat.c; and
c:\youme\themes\theme_name\doll_name\youme_chat.h
```

The resulting binary data files can be saved as:
c:\youme\themes\theme_name\doll_name\player.sb.

The binary data file contains the entire information set required to run the conversation on each doll. This binary data file includes the firmware for the processor, and so additional features can be incorporated into the doll's functionality without the requirement for an additional process to update the firmware.

In order that the correct phrases are recorded as way files for the dolls a list of all the distinct phrases (spoken_text_strings) for each doll is created and output using the dictionary generation engine 1110, as shown in FIG. 11; this is a dictionary of phrases required for each doll. The dictionary generation engine 1110 communicates with the database 1122 within the server 1004, and compiles the list based on the information stored on the theme within the database. The dictionary is effectively a look-up table between the expression/statement and the ID number allocated to the expression/statement.

The phrases used by each doll are defined in the Statements field and the Attributes field of each context row. They can be explicitly defined spoken_text_strings or they can be references to custom attributes. Whenever an explicit spoken_text_string is defined it is allocated a file name such as A00xxx.wav in sequence starting at A00001.wav. The number xxx will also be the phrase index. The list of spoken_text_strings can be saved in the following files:
  c:\youme\themes\theme_name\phrases.txt—this contains a list of all the phrases used in this theme
  c:\youme\themes\theme_name\doll_name\phrases.txt— these contain a list of all the phrases used by each doll
  These files will contain text in the following format:
  A00xxx The associated phrase as text
  In this way, the process of creating the large number of way files is simplified as the list of phrases can be recorded sequentially, saved with the appropriate file name, and prepared for downloading for use in the doll, or PC in the case where the PC acts as a virtual doll.

As shown in FIG. 12a, the process for generating the files is activated by the button 1212 "generate files". The user selects the appropriate theme, that has been completed, and presses the button 1212. This then generates the files as described above. The entire bundle of files is then uploaded to the doll; this bundle includes the binary file of the theme and accompanying operating system, the sound (way) files for the speech, and the processor operating code (firmware).

The array of youme_conversation_struct_t conversation structures, as described above, is the main controlling data for the conversation. In outline, when the conversation is operated in the controller doll, the conversation engine starts at the context specified by index 1 of this array for the first doll. It then performs the following actions:
1. It calls the current context's transition procedure to decide which doll will be next.
2. It calls the current context's set procedure to set the values of any attributes specified in the context.
3. It calls the current context's say procedure to select which statement to speak according to the data specified in the context. This will result in wireless communication to a remote doll if the current doll is not the controller doll. In either case, the engine waits until the audio output has completed before proceeding.
4. It calls the context's branch procedure to select the next index into the conversation array to use.
5. It sets the previous doll pointer (prev) equal to the current doll pointer (me).
6. It sets the current doll pointer (me) equal to the next doll pointer (next). The next doll pointer has been set in step 1.
7. It then starts at step 1 again with the new index and with the new doll, and continues this process until it hits a FINISH branch in one of steps 4.

USB Communications Dongle

Figure 16:
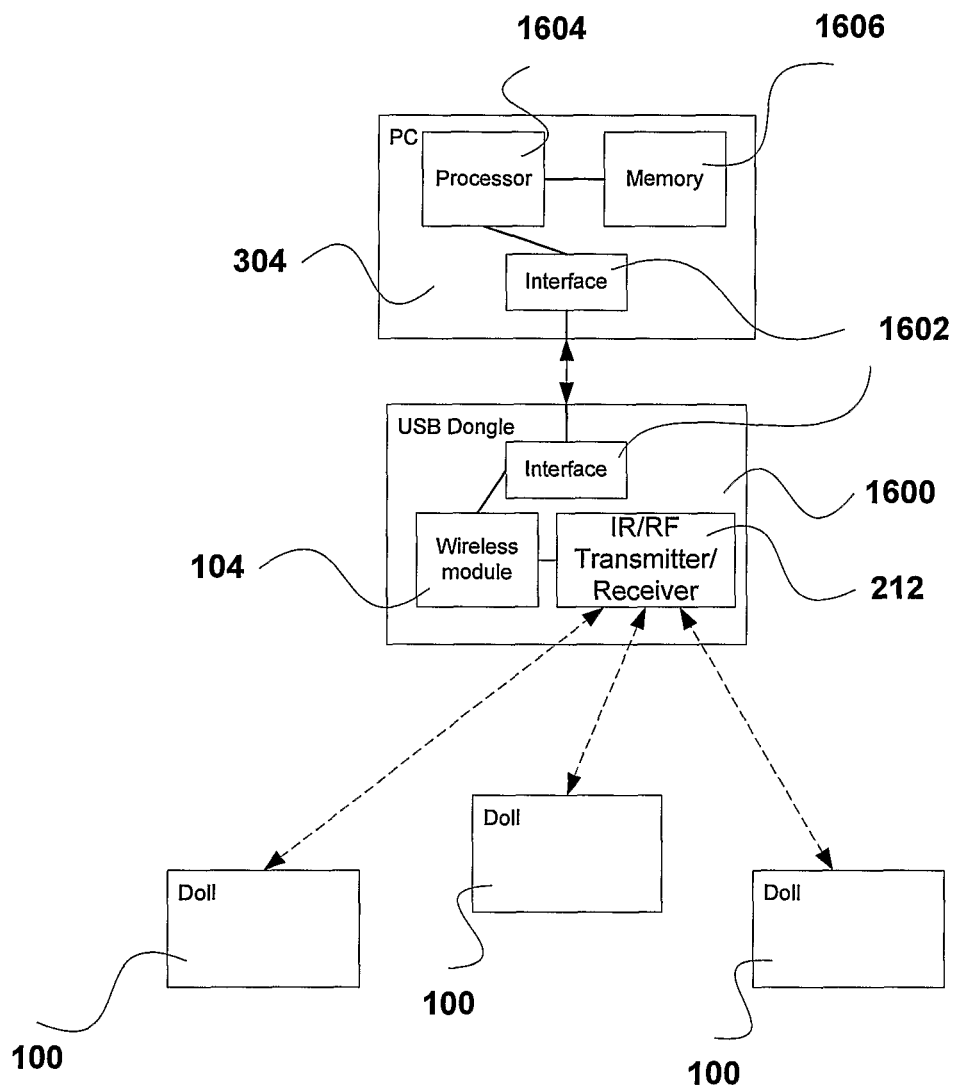
FIG. 16 shows a USB dongle in communication with multiple dolls.

In a further embodiment, a USB communications dongle is provided that enables a PC to wirelessly interact with a toy as described herein. FIG. 16 shows a schematic representation of the USB communications dongle 1600, attached to a PC 304, and in wireless communication with the dolls 100. The dongle contains a wireless module 104, an IR/RF transmitter/receiver 212, and an interface 1602. These components, except the interface 1602, are the same as contained within the doll 100, as described above. However, the PC 304 is utilised as the processor 1604, instead of the dongle having an independent processor as the doll 100 has, and so the PC effectively becomes a virtual doll able to communicate with the physical dolls 100. The virtual doll is provided with an animated avatar shown on the PC monitor, that may be similar in appearance to the real doll, and whereby the animation of the avatar is synchronised with the speech of the doll. In order to run the conversations, the PC has stored in memory 1606 an emulator for emulating the processor of the toy. Alternatively, the authoring tool, as described above, outputs specific code for the PC based virtual doll. In both cases the themed conversation data is used to run a conversation using an application running on the PC that emulates the firmware of the toy/doll. The speech of the toy/doll is output via the PC speakers.

The interface 1602 is a USB connection, and provides an efficient way to connect the wireless communications dongle 1600 to the PC 304. The wireless communications protocol used by the dongle is the same as that used between the dolls as described herein, i.e. IEEE 802.15.4.

When the user connects to the website he/she is able to use the USB communications dongle to facilitate a conversation between a physical doll, and a virtual doll animated within the website. In this way a single user can use the functionality of the doll's conversation engine without the requirement for multiple physical dolls. In addition, the virtual doll can take part in a conversation with multiple physical dolls. The virtual dolls can also interact with other virtual dolls, e.g. if two users each had a laptop computer with a USB communication dongle.

Game Playing

In a further embodiment the toy is also adapted to play games with the child. For example, board games such as Snakes and Ladders, Mousetrap, Ludo, or any other chance based game that can be played using dice can be played by the toy.

The toy is provided with a random number generator that is used to simulate a die, or dice. Furthermore, the toy is adapted to count the number of spaces to be progressed along the board by the playing piece. The toy audibly signals the child to move the playing piece the required number of spaces. Once the child has moved the playing piece the child indicates to the toy, by pressing a button or the like, that it is the next toys/child's turn. Alternatively, the board is also interactive and contains sensors or the like to receive information from the playing board regarding the position of the counters. Play progresses in this way until there is a winner.

Figure 5:
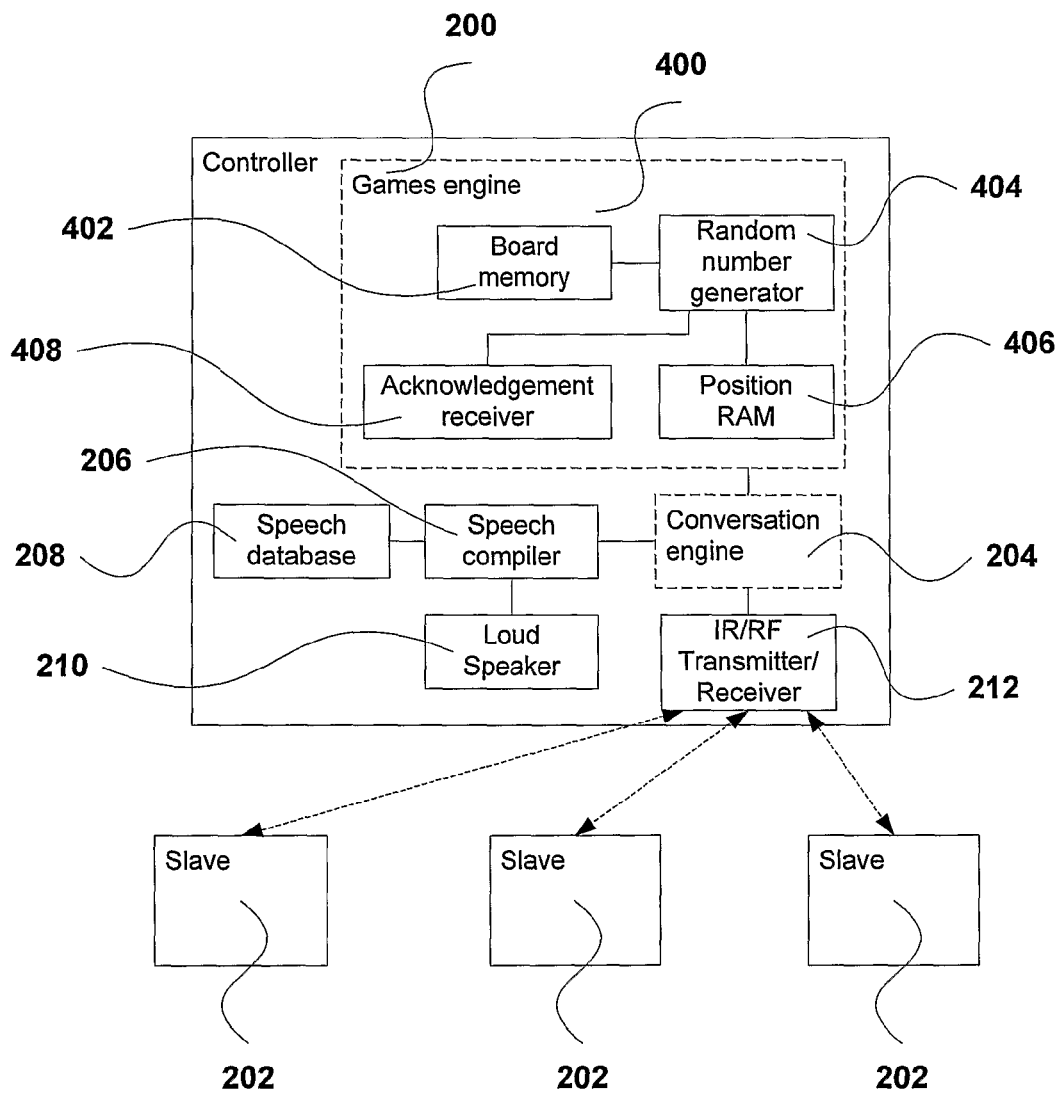
FIG. 5 is a schematic illustration of a doll adapted to play games.

FIG. 5 provides a schematic illustration of a controller toy 200 further comprising a games engine 400. The remaining components are the same as described in FIGS. 2 and 3. The games engine 400 comprises a board memory 402, a random number generator 404, position RAM 406 and an acknowledgement receiver 408.

The board memory 402 stores information relating to the layout of board games such as Snakes and Ladders or Ludo. The random number generator is used to simulate dice, and is adapted to produce the numbers 1, 2, 3, 4, 5 and 6 (or any other set of numbers appropriate to the game. The position RAM is used to store information regarding the position on the board of each of the players, in this case the controller and the three slaves. This information is used in conjunction with the board memory and the virtual dice roll to count the appropriate number of positions for the playing piece to move, and to know whether the square the playing piece has moved to has any special relevance, such as is it the bottom of a ladder or the top of a snake.

The conversation engine 204 utilises the information obtained from the games engine to count the number of spaces, for example if the original position was square 13, and the virtual dice roll produce a 4, then the doll would vocalise through the loud speaker 210, "I've rolled a 4, 14, 15, 16, 17". In this example if square 17 was the top of a snake then the doll would go on to vocalise, "oh no, I've slipped down a snake to square 6!". The counting mechanism cycles through the text the appropriate number of times, and then remembers the final position, within the position RAM 406. So, for example, when the virtual dice rolls a 4 the list of numbers is accessed 4 times to produce the end result.

Additionally, the doll has the ability to receive information from an external random number generator that is activated by the child. In this way the child can play with the dolls, and the doll can keep track of all of the player's playing pieces including the child to determine when there is a winner.

Figure 6:
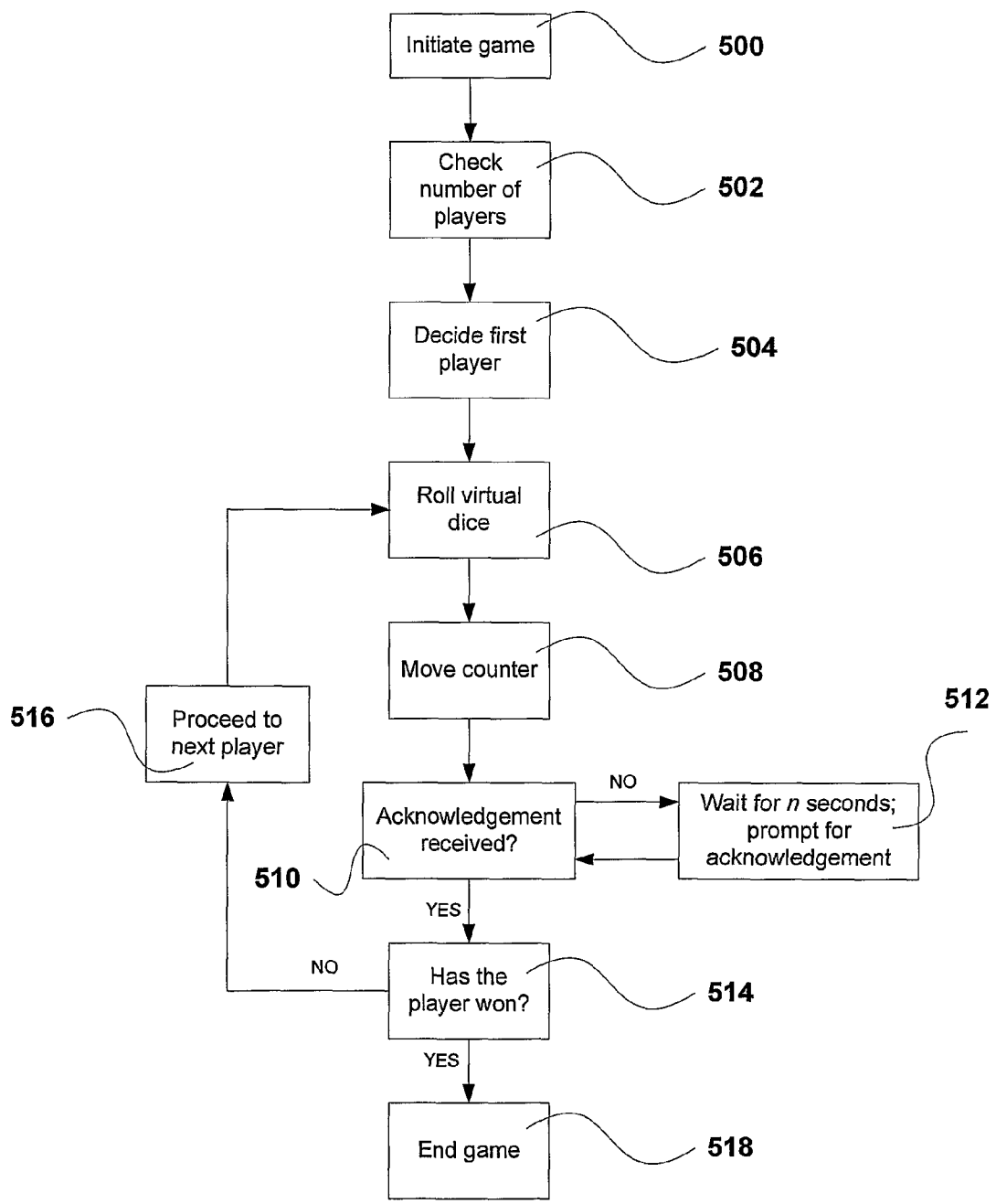
FIG. 6 is a flow diagram of the process of playing a game.
Figure 7:
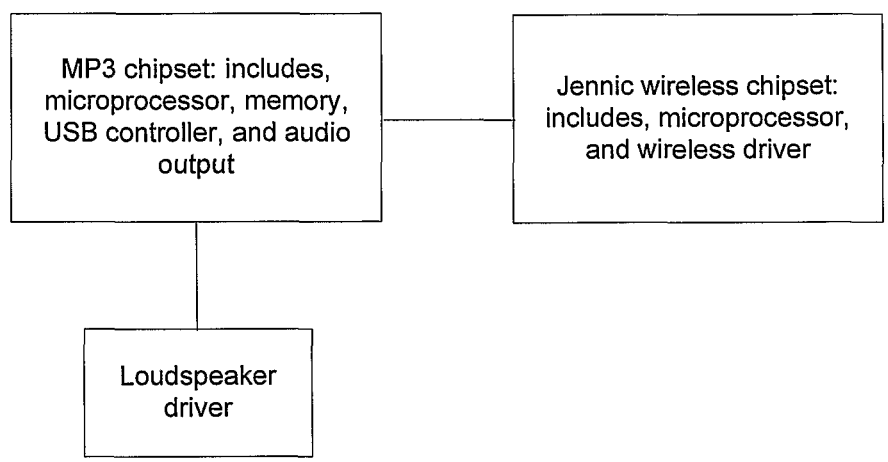
FIG. 7 is a schematic of an alternative embodiment.

FIG. 6 shows a flow diagram of the process of playing a game. The game is initiated by the user, step 500, and the controller doll will perform a check, step 502, to determine the number of players. The controller doll will then decide on the first player, step 504, using the random number generator or the like. The controller doll then rolls the virtual dice, step 506, for the first player, or if the child is the first player the controller doll asks the child to roll their dice. The controller doll then instructs the player to move the counter/playing piece, the corresponding number of squares on the board, step 508, and then waits for acknowledgement that the child has moved the counter, step 510. At step 512 the controller doll waits a pre-determined number of seconds, such as 2, 3, 5, or 8 seconds, before prompting the child for acknowledgment that the counter has been moved. Once the controller doll receives acknowledgement a check is performed, step 514, to determine whether the player has won the game. If the player has not won the game then the play proceeds to the next player, step 516, and the process continues from step 506 until a player wins, step 518.

The games engine is adapted to play any rule based game in the manner described above.

Alternatively, the system could implement a conventional programming language, such as C, to run more complex algorithms to play more complex games such as chess. The same language as described above would be used to generate the conversations and would be referenced from the C program.

Such toys and dolls provide children with different opportunities for interaction, and enhance their play.

Theme Examples

Provided in the Computer Program Listing Appendix that was submitted as a text file via EFS-WEB are four examples of themed conversations between dolls. The examples provide different methods of constructing a conversation. There are two examples of randomly generated conversations, the Zoo and Pet themes, one example of a fully scripted conversation, the Mr X theme, and one example of a game playing theme, the Snakes and Ladders theme.

The unit's processor 102 is used in conjunction with the other modules, such as the speech compiler 206, the speech database 208, and the parameter storage 216, to interpret the script within the themes. For example, when a variable is defined memory is allocated within the parameter storage. Each time the conversation is initiated the variables are allocated within the parameter storage. This enables the theme to be changed, i.e. from Zoo to Pets, and for the new variables to be allocated the appropriate memory resources without conflicting with the variables from a previous conversation. Furthermore, the parameters such as PREV, NEXT, and ME are also allocated memory within the parameter storage. This enables the SELECT statement to reference the parameter within the script.

When the SAY statement is used either the controller doll uses the communication protocol described above to transmit the command to the relevant doll using the wireless module and transmitter, or if the controller doll is the current speaker the controller doll's relevant modules are utilised. The Speech compiler 206 within the doll required to speak is utilised to access the appropriate audio file within the Speech database 208. For example, the first line with a SAY statement within the Zoo theme is "SAY (i think we've seen everything now, p03,lets go home)". This statement consists of three references to audio files within the Speech database. Those references are "i think we've seen everything now"; "p03"; and "lets go home". They all refer to audio files but the "p03" reference refers to a pause of a specific length. The pauses are blank audio files used to space the audio files appropriately. The Speech compiler 206 then uses the loud speaker 210 to play the audio files.

The example themes within the Computer Program Listing Appendix that was submitted as a text file via EFS-WEB provide further examples of the use of the statements defined above. In each case the processor interprets the code and utilizes the appropriate module to execute the statement.

In an alternative embodiment, as described herein, the processor does not use an in-built interpreter, but instead each theme consists of a binary data file that includes all of the processor control instructions to enable the processor to function correctly. This effectively enables the firmware of the processor to be updated with new features whenever required. The theme examples provided below can all be generated using the authoring tool. However, the instructions to control the toys/dolls would be a binary file of compiled "C" code.

Processor and Associated Electronics

Figure 8:
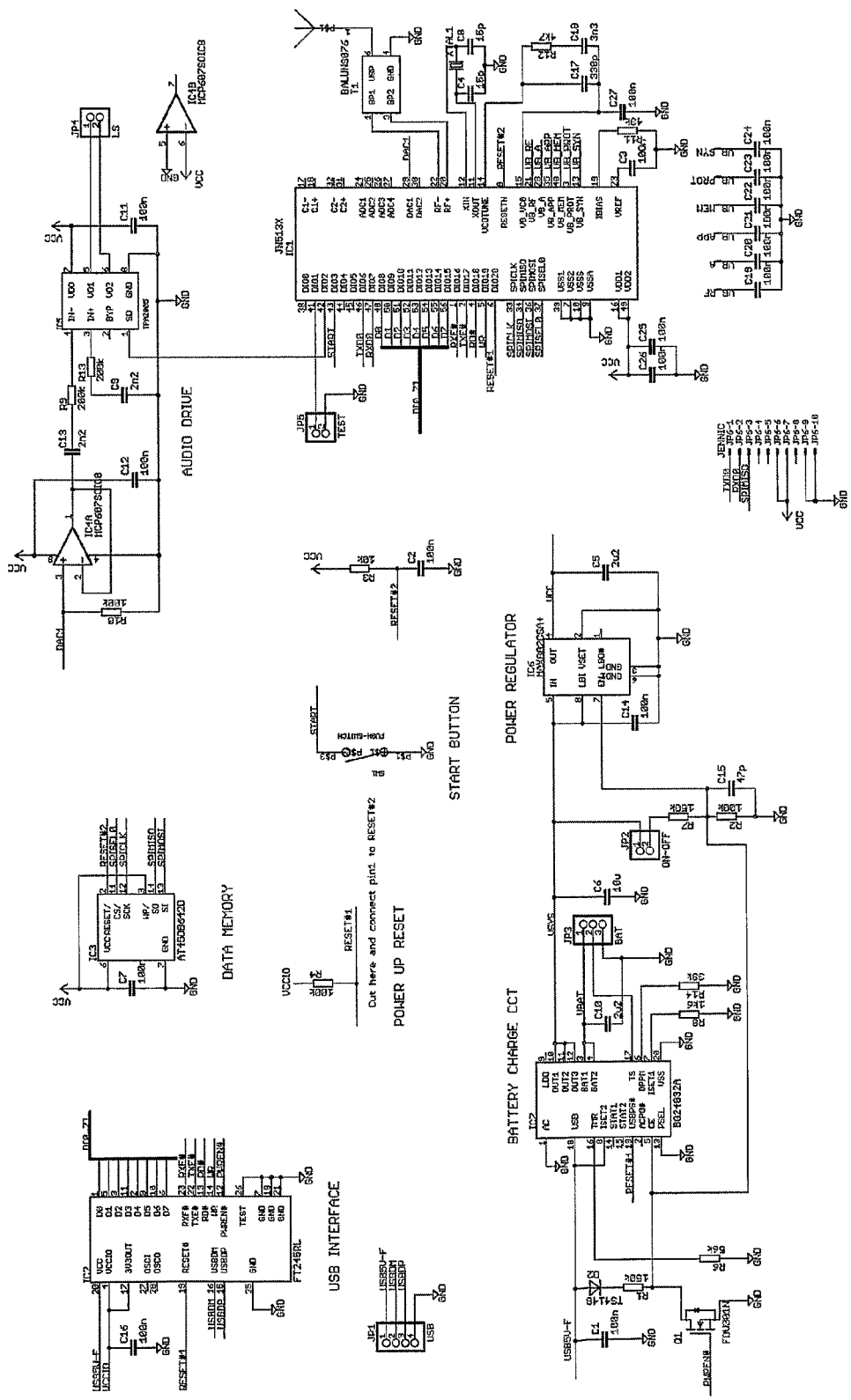
FIG. 8 is one embodiment of a circuit diagram of the processor and associated electronics.
Figure 9:
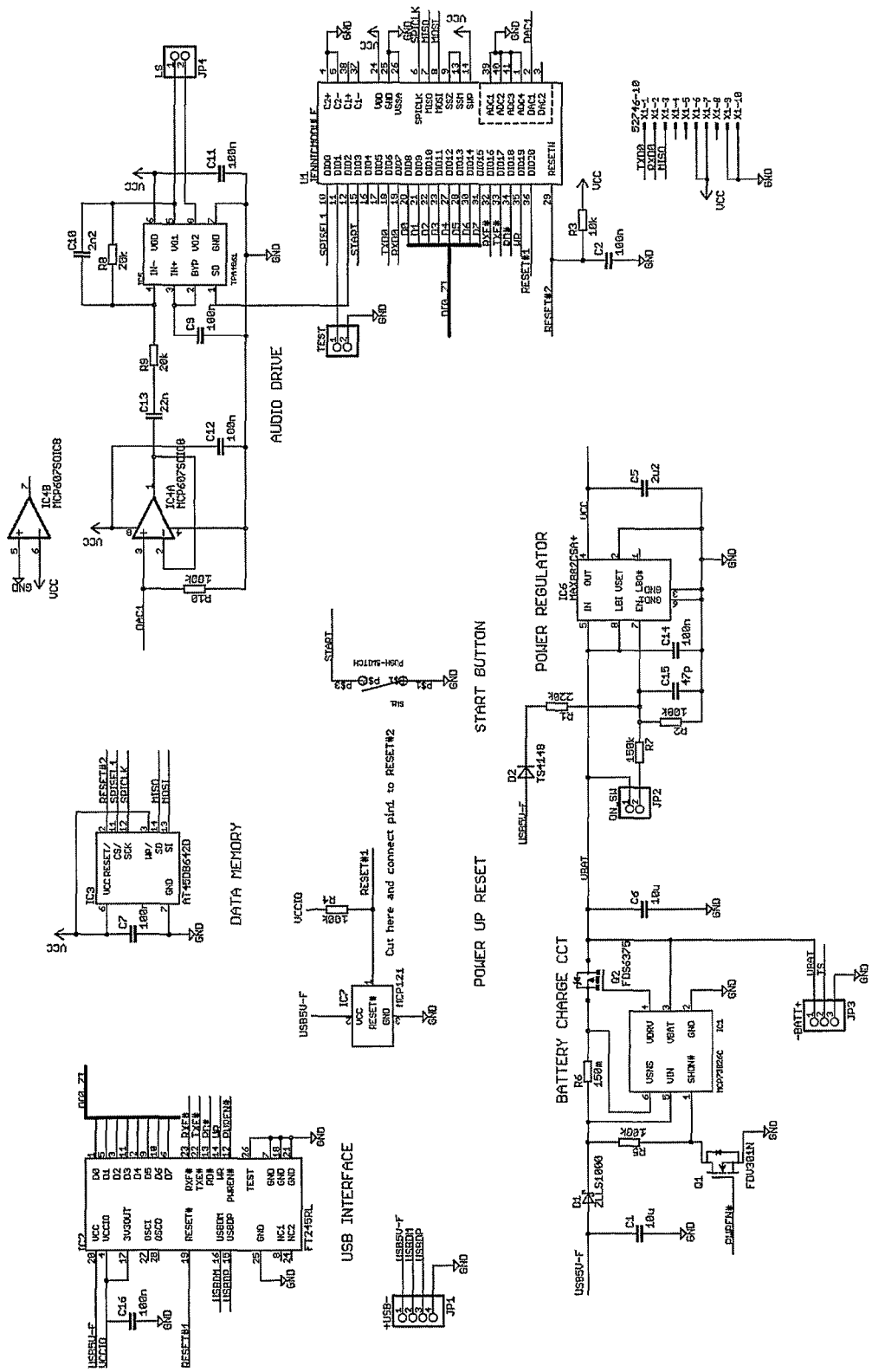
FIG. 9 is an alternative embodiment of a circuit diagram of the processor and associated electronics.

FIG. 8 shows the schematic of a circuit diagram and parts list for a potential production version of the schematic diagram shown in FIGS. 2 and 3—Appendix I details the components within FIG. 8. FIG. 9 shows the schematic of an alternative circuit diagram—Appendix II details the components within FIG. 9. There are alternatives that could have been included in the production circuit, and these are discussed later.

The Circuit Includes:

The Jennic Wireless Controller

The production circuit uses the Jennic IC, contains the RF circuitry, and combines the firmware and data in to a single large Flash memory IC. The Jennic wireless controller can use the Zigbee wireless communications protocol for example to communicate between the dolls.

The Battery Charger

The production circuit uses a part that is specifically designed to charge from the USB port and also power a circuit whilst charging.

The Audio Amplifier

The audio amplifier on the production circuit is a class-D audio amp. This is very efficient (~80%).

Technical Options

This section discusses possible alternatives that have not been included in the production circuit in FIG. 8.

USB Interface

FTDI FT245RQ

This component was chosen primarily as it a ready-to-use IC complete with USB driver software, reducing development effort. Its main disadvantage is that it uses most of the DIOx lines on the Jennic. Although this is not an issue with the current design, if DIOx lines are needed for other options, e.g. speech compression IC, then this part would be unsuitable.

Alternative Embodiments

Both the alternatives below are 8-bit microcontroller ICs with built-in USB and SPI slave interfaces. They both need to have firmware and software drivers developed to make them functional, although both manufacturers provide reference designs, application notes etc to aid in this process. The advantage of these parts are that they can interface with the Jennic SPI interface, and only need 1 DIOx line, freeing up the other DIOx lines for other uses.

The toy does not have complex USB requirements; the only requirement is to download data to be programmed in to Flash memory. The device does not need to conform to any generic device functionality, e.g. memory sticks. This reduces the development effort required.

The parts identified below were chosen as they are targeted at simple low-power embedded applications and have an SPI slave interface. However, other devices from the manufacturers' families or from other manufacturers may well be equally suitable.
Cypress CY7C63833-LFXC
Atmel AT90USB82-16MU
Battery
Lithium-Ion The circuits shown in FIGS. 8 and 9 use a Lithium-Ion (Li+) battery. The Li+ battery was chosen for 3 reasons:
  i) Shape—it is available in a flat prismatic package that was convenient for the demonstrator project.
  ii) Ease of development—Li+ charging requirements are simpler than the alternatives, especially when the charger has to power an additional circuit at the same time.
  iii) Power capacity—a conservative estimate of power requirements at the start of the demonstrator project suggested that only Li technology would give enough power in the small space available. (See later).

Alternative rechargeable technologies are NiMH and NiCad. NiMH has similar charging requirements to NiCad (more complex than Li+), but has similar (higher) power density (holds more power for a given physical volume) and price to that of Li+.

NiCad/NiMH

The characteristics of NiCad/NiMH batteries compared to Li+ will be considered in this section. For simplicity, read NIMH for NiCad in the sections below.

i) Shape

NiCad batteries usually come in standard sizes such as AA, and MA, although other shapes are available. In a production environment where smaller components can be used, and where the cost of manufacturing more complex PCBs, such as two pieces and/or flexible circuits/connectors may not be inhibitive, the use of standard size batteries may be possible.

ii) Ease of Development

The circuit must be powered up (from the USB port) at the same time as the battery is charging (from the USB port), so that it can download new data. (The battery cannot simultaneously be charged and power the circuit.) It is possible to either isolate the circuit from the battery during charging or leave the circuit connected. Isolating the battery involves more complex circuitry. Leaving the circuit connected means that the charger sees both the normal current to the battery that it is controlling and the extra current our circuit takes.

Leaving the circuit connected for Li+ battery chargers is not so critical. The main disadvantage is that it is normal to switch off the charger once the Li+ battery is fully charged. This function has to be inhibited otherwise our circuit would be switched off as well. The result is a shorter lifetime for the battery.

Leaving the circuit connected for NiCad battery chargers is critical. NiCad batteries have a more complex charging profile, especially towards the end of charging. If this profile is not detected correctly, the battery is never fully charged, or the battery is overcharged resulting in damage to the battery and excessive temperature rises. Battery chargers use one of two methods to detect this profile. The first is by changes in current drawn by the battery. Unfortunately, the currents drawn by the present circuit will confuse the charger, resulting in potentially dangerous circumstances. The second method is by detecting changes in temperature of the battery. However, the battery charging components also get hot during normal use. In this application, it may be difficult to thermally isolate the battery enough to give reliable results.

Isolating the battery is the solution adopted by the circuit in FIG. 8. The battery charger IC incorporates sophisticated power management circuitry and provides the isolation. This integrated power management is not available for NiCad technology in off-the-shelf products. So this would be implemented in discrete components or in a custom integrated IC.

iii) Power capacity

A discussion of the power requirements on the doll electronics is given in this section. Battery lives used in this section are based on the following battery capacities:
  AAA Alkaline=1150 mAh @ 1.5V
  AAA NiCad=300 mAh @ 1.2V
  AAA NIMH=750 mAh @ 1.2V
  Li+ prismatic=620 mAh @ 3.7V Note: The Li+ battery holds twice as much power for the same rating as the other batteries because its voltage is twice as large. Either two AAA batteries must be used in series, or a single AAA is used with a step-up converter and its capacity is halved.

Power Estimates for Circuit Shown in FIG. 9.

Estimated current consumption=136 mA when speaking, 48 mA otherwise. This is made up from:
  Jennic module=48 mA
  Audio Driver: 250 mW max 8 ohm speaker power=175 mA, but in a conversation between 2 dolls each doll speaks for half the time=>88 mA. Note: It is unlikely that the speaker will be driven at maximum power the whole time, however the audio amp is not 100% efficient, so 88 mA is a reasonable compromise.
  Rest of circuit=negligible Battery Lives Based on Demonstrator Estimates.

| Battery | Continuous conversation | Powered but no speaking |
| --- | --- | --- |
| Single AAA Alkaline | 4¼ hrs | 12 hrs |
| Single AAA NiCad | 66 mins | 3 hrs |
| Single AAA NiMH | 2¾ hrs | 7 hrs 40 mins |
| Dual AAA Alkaline | 8½ hrs | 24 hrs |
| Dual AAA NiCad | 2¼ hrs | 6¼ hrs |
| Dual AAA NiMH | 5½ hrs | 15 hrs 40 mins |
| Single prismatic Li+ | 4½ hrs | 13 hrs |

The single prismatic Li+ solution was the obvious choice for the demonstrator.

Power Requirements of the Circuit Shown in FIG. 8.

As the audio power is the most significant factor in the overall power consumption, it is important to get a more precise value. The best method is a direct measurement, but this is only possible once the audio performance is finalised.

However, there are a number of factors that suggest the audio power will not be as great as the estimates:
  The characteristics of speech make the average power of a waveform a lot less than its peak amplitude. For instance, speech contains a lot of pauses. So it is likely that the circuit will drive at less than the maximum average power levels.
  The class-D amplifier used in the production circuit has much better efficiencies than the one in the circuit shown in FIG. 9, resulting in a significant power saving.

More detailed calculations and analysis of the demonstration conversations suggest that the average audio power will be only 10 mA whilst speaking, so for a conversation between 2 dolls gives and average of 5 mA. This makes the Jennic power dominate giving a total of 53 mA when speaking and 48 mA when not.

Note: This audio power level is only for spoken voices, not music.

Battery Lives Based on Improved Estimates for Audio Power

| Battery | Continuous conversation | Powered but no speaking |
| --- | --- | --- |
| Single AAA Alkaline | 10 hrs 50 mins | 12 hrs |
| Single AAA NiCad | 2¾ hrs | 3 hrs |
| Single AAA NiMH | 7 hrs | 7 hrs 40 mins |
| Dual AAA Alkaline | 21 hrs 40 mins | 24 hrs |
| Dual AAA NiCad | 5½ hrs | 6¼ hrs |
| Dual AAA NiMH | 13 hrs 50 mins | 15 hrs 40 mins |
| Single prismatic Li+ | 11½ hrs | 13 hrs |

There are ways to reduce the power consumption of the Jennic. Currently, the Jennic is on all the time, listening for messages continually. With a change in the firmware, and the way the dolls communicate with one another, only one doll (the first to be powered up) needs to be listening continually. The other dolls can check periodically with the first doll if they need to speak, and only need to be powered for this short time. The rest of the time the Jennic can be in low-power sleep mode. If a 10% duty cycle is achievable this would cut the power consumption by a factor of 10 when not speaking. When speaking, the Jennic needs to be powered, but it does not need to listen for messages, so the RF stage can be unpowered. This reduces the Jennic power consumption by a factor of 4. Thus it may be possible to reduce the overall current consumption to 14 mA when speaking and 4 mA when not.

Although the most dolls would have this reduced power requirement, one doll (the first to be switched on) would not have this power saving. With a change in the way the dolls are activated it may be possible to reduce this as well. Further investigations are needed to determine what is feasible.

Battery Lives Based on Reduced Jennic Power Requirement

| Battery | Continuous conversation | Powered but no speaking |
| --- | --- | --- |
| Single AAA Alkaline | 41 hrs | 143¾ hrs |
| Single AAA NiCad | 10¾ hrs | 37½ hrs |
| Single AAA NiMH | 26¾ hrs | 93¾ hrs |
| Dual AAA Alkaline | 82 hrs | 287½ hrs |
| Dual AAA NiCad | 21½ hrs | 75 hrs |
| Dual AAA NiMH | 54½ hrs | 187½ hrs |
| Single prismatic Li+ | 44½ hrs | 155 hrs |

If these power requirements can be achieved then the use of dual AAA standard, NiCad or NiMH batteries becomes possible.

Automatic Power-off Function

The current specification for the doll electronics is that an ON-OFF switch controls the powering of the circuit. Unlike other toys, it is not obvious when the doll is switched on, as it sits passively waiting for a button to be pressed in any one of the active dolls. This means that it is highly likely that the dolls will be forgotten to be switched off. The result is that the next time (e.g. next day) the doll is played with the batteries will be dead.

It is possible for the circuit to switch itself in to a 'standby' mode, drawing very little current, but this has not been included in the current functional specification. When the electronics goes in to this standby mode and how it is re-activated has implications for the overall behaviour and performance of the doll.

Speech Compression

Speech compression allows more audio data to be stored in the same amount of memory. The current designs do not contain any speech compression technology. The current designs use 8-bit 8 kHz audio data that results in a data rate of 64 k bps (bits per second), and uses a 64 Mbit serial flash memory enabling about 1000 seconds (17 minutes) of audio data to be stored. Speech compression can be used to drop this data rate to between 2 kbps and 8 kbps, the higher compression the lower the audio quality. So at 8 kbps a 4 Mbit flash memory can hold about 500 seconds (8½ minutes) of audio data.

Compressed audio data requires decompression as it is played out. This can be done in software or dedicated hardware. A few options are given below.

Software Decompression on Jennic Controller

This option has not been widely investigated. Firstly, the source code of suitable compression/decompression algorithms must be found, so that the algorithms can be ported on to the Jennic controller. Secondly, and analysis of processing power required by the algorithms and available on the Jennic controller must be done.

Sensory Inc Speech Synthesis ICs

Sensory Inc has two microcontroller families. The SC-6x family has the pre-programmed SC-691 slave synthesiser. This has a 4-bit MCU interface that requires 9 DIOx lines to interface to the Jennic and can direct drive a 32-ohm speaker. The newer RSC-4x family does not have a pre-programmed slave synthesiser, and so requires custom firmware to be developed. It would interface to the Jennic with a 4-bit or 8-bit MCU interface (9 or 15 DOIx lines). However it has a more powerful processor (it can handle speech recognition algorithms), and can direct drive an 8-ohm speaker. Either of these parts could not be used with the USB FT245 chip, as the Jennic does not have enough DIOx lines for both. A slave SPI USB chip would be necessary (see USB section).

Using a speech synthesis microcontroller such as RSC-4x that has significant processing power suggests a possible alternative system architecture. Instead of the Jennic wireless microcontroller running the main doll algorithms, and using the synthesis microcontroller as a slave co-processor to simply decompress the audio, the synthesis microcontroller could run the main doll algorithms and use the wireless microcontroller as a slave co-processor for wireless communications. See the Wireless microcontroller section for further details.

Wireless Microcontroller

The current design is based on the 2.4 GHz IEEE 802.15.4 Personal-Area-Network communications standard. Wireless microcontroller products exist that contain the necessary RF hardware and firmware to take care of all low-level RF communications. Only the data in the communications needs to be defined by the doll application. The current design has selected the Jennic wireless microcontroller.

Although the IEEE 802.15.4 products take care of the low-level RF communications, there is one aspect that is not a good fit with the doll application. The IEEE 802.15.4 is based on a hierarchical structure of nodes, with many reduced function devices communicating with a full function device. The doll application has a peer-to-peer structure, where all devices are the same.

Other RF transceiver products that work in the same 2.4 GHz or different ISM frequency bands are available. They contain all the necessary RF hardware, but do not impose a particular low-level protocol. These transceiver ICs work as a slave to either a general purpose microcontroller or dedicated microcontroller such as the RSC-4x speech synthesiser. Using these parts a proprietary peer-to-peer communications protocol could be developed.

Examples of RF transceivers are TI CC2500 and Atmel ATA542x family. These parts potentially provide lower power consumption and lower unit costs than the Jennic IC.

It is of course to be understood that the invention is not intended to be restricted to the details of the above embodiments which are described by way of example only, and modifications of detail can be made within the scope of the invention.

Each feature disclosed in the description, and (where appropriate) the claims and drawings may be provided independently or in any appropriate combination.

APPENDIX II

Details of components relating to FIG. 8

| Part | Description | Value | Comment |
|---|---|---|---|
| R8 | Resistor 1% | 1k6 | |
| R12 | | 4k7 | |
| R14 | | 39k | |
| R11 | | 43k | |
| R6 | | 56k | |
| R2 | | 100K | |
| R7 | | 150k | |
| R9, R13 | | 200k | |
| R1 | | 220k | |
| R3 | Resistor 5% | 10k | |
| R4, R10 | | 100k | |
| C4, C8 | Capacitor, 5% COG | 15p | |
| C15 | | 47p | |
| C17 | | 330p | |
| C9, C13 | Capacitor, 10% X7R | 2n2 | |
| C18 | | 3n3 | |
| C1, C2, C3, C7, C11, C12, C14, C16, C19, C20, C21, C22, C23, C24, C25, C26, C27 | Capacitor, hi-cap multilayer ceramic decoupler, 6v3 | 100n | |
| C5, C10 | | 2u2 | |
| C6 | | 10u | |
| IC1 | IEEE 802.15.4 wireless controller | JN513x | www.jennic.com |
| IC2 | Low speed USB peripheral controller | FT245R | www.ftdichip.com |
| IC3 | 64 Mb serial flash | AT45DB642 | www.atmel.com |
| IC4 | Micropower op amp | MCP607 | www.microchip.com |
| IC5 | Class-D Audio Driver | TPA2005 | www.ti.com |
| IC6 | LDO reg 3v3, 200 mA w shutdown | MAX882CSA+ | www.maxim-ic.com |
| IC7 | Battery charger, USB and power management | BQ24032A | www.ti.com |
| Q1 | Digital FET switch/inverter | FDV301N | www.fairchildsemi.com |
| D2 | Signal diode | TS4148 | |
| J1 | Ceramic antenna 2.45 GHz 50R | | Alternative: printed circuit antenna |
| T1 | Balun Transformer 2.45 GHz 200R(diff): 50R(unbal) | e.g. Murata LDB182G4520C-110 | |
| XTAL1 | Crystal resonator | 16.0 MHz | |
| SW1 | Push button switch | START | |
| JP1 | Mini B USB connector | e.g. Molex 54819-0519 | www.molex.com |
| JP5 | TEST connection | | Optional |
| JP6 | JENNIC connection | | Optional: for debugging |
| SW2 (JP2) | SPST switch | ON-OFF | |
| B1 (JP3) | Li+ battery 620 mAh | Olympus camera battery Li-30B | |
| LS1 (JP4) | Loudspeaker, 8 ohm | ADS02008MR-R | www.projectsunlimited.com |

APPENDIX III

Details of components relating to FIG. 9

| Part | Description | Value | Order Code |
|---|---|---|---|
| R6 | Resistor 1% | 0R15 | FEC 1107344 |
| R8, R9 | | 20k | FEC 9332774 |
| R2 | | 100K | FEC 9332405 |
| R7 | | 150k | FEC 9332626 |
| R1 | | 220k | FEC 9332839 |
| R3 | Resistor 5% | 10k | FEC 9332391 |
| R4, R5, R10 | | 100k | FEC 9332405 |

APPENDIX III-continued

Details of components relating to FIG. 9

| Part | Description | Value | Order Code |
|---|---|---|---|
| C15 | Capacitor, 5% NPO | 47p | FEC 9406263 |
| C10 | | 2n2 | FEC 9406220 |
| C13 | Capacitor, 10% X7R | 22n | FEC 9406360 |
| C2, C7, C9, C11, C12, C14, C16 | Capacitor, Decoupler X7R | 100n | FEC 1294627 |
| C5 | | 2u2 | FEC 9402152 |
| C1, C6 | Capacitor decoupler X5R | 10u | FEC 9227814 |
| U1 | IEEE 802.15.4 wireless controller module | JN5121-00-M00 | www.sequoia.co.uk |
| IC1 | Battery charger | MCP73826C-4.2VCHTR | FEC 1084313 |
| IC2 | Low speed USB peripheral controller | FT245RL | FEC 1146034 |
| IC3 | 64 Mb serial flash | AT45DB642D-TU | FEC 1095799 |
| IC4 | Micropower op amp | MCP607-I/SN | FEC 1196812 |
| IC5 | Audio Driver | TPA301D | FEC 8456518 |
| IC6 | LDO reg 3v3, 200 mA w shutdown | MAX882CSA+ | FEC 1188007 |
| IC7 | Voltage monitor, 4v75 | MCP121T-475E/TT | FEC 8752893 |
| Q1 | Digital FET switch/inverter | FDV301N | FEC 9845011 |
| Q2 | p-channel power MOSFET | FDS6375 | FEC 9846212 |
| D1 | Schottky diode, 1A | ZLLS1000 | FEC 9525688 |
| D2 | Signal diode | TS4148 RY | FEC 8150206 |
| SW1 | START Push button switch | 6 mm SMD | FEC 3121173 |
| JP5 | TEST connection | | |
| JP6 | JENNIC connection | Molex 52746-1070 | FEC 9786325 |
| SW2 (JP2) | SPST switch | ON-OFF | |
| JP1 | Mini B USB connector | e.g. Molex 54819-0519 | FEC 9786465 |
| B1 (JP3) | Li+ battery 620 mAh | Olympus camera battery Li-30B | |
| LS1 (JP4) | Loudspeaker, 8 ohm | ADS02008MR-R | FEC 1192972 |

What is claimed is:

1. An authoring tool for creating themed data for toys, comprising:
    an interface for receiving content relating to a particular theme, said interface being adapted to receive separately content that comprises separately both scripting data relating to the particular theme, and expression data defining the personality of said toy;
    a processor for processing said content, comprising both said scripting data and said expression data, to generate a set of instructions for operating said toy within said particular theme, wherein the processor is coupled to the interface; and
    an ouput for outputting said set of instructions, wherein the processor is coupled to the output.

2. The authoring tool according to claim 1, wherein said interface is adapted to receive content in discrete portions.

3. The authoring tool according to claim 2, further comprising a processing unit for allocating a unique ID number to each expression data portion.

4. The authoring tool according to claim 3, wherein said processor is adapted to utilise said unique ID numbers as references to said expression data portions in said set of instructions.

5. The authoring tool according to claim 1, wherein said expression data comprises at least one of: a theme name, the toys' names, and statements used by the toys to interact.

6. The authoring tool according to claim 1, wherein said scripting data comprises at least one of: the number of toys that can interact within the theme, a method of interaction, theme related parameters, and toy related parameters, and preferably said method of interaction is at least one of a method of transitioning between toys, a method of outputting the expression data, and a method of branching to different portions of said themed data.

7. The An authoring tool according to claim 1, further comprising a storage for storing together, in an array, said scripting data and expression data relating to a particular theme.

8. The authoring tool according to claim 7, wherein said processor is adapted to generate said set of instructions from said array.

9. The authoring tool according to claim 1, wherein said processor includes a list compiler for compiling at least one list comprising at least some of the expression data.

10. The authoring tool according to claim 9, wherein said list compiler is adapted to compile a respective list for each toy in said particular theme.

11. The authoring tool according to claim 1, wherein the expression data is symbolic data.

12. The authoring tool according to claim 11, further comprising a recorder for recording enacted data versions of the symbolic data.

13. The authoring tool according to claim 12, further comprising a prompt for prompting an actor to generate the requisite portion of enacted data.

14. The authoring tool according to claim 12, wherein said processor is adapted to generate a look-up table between the symbolic data and enacted data.

15. The authoring tool according to claim 1, wherein said processor is adapted to output the expression data.

16. The authoring tool according to claim 15, wherein said processor is further adapted to output the expression data and set of instructions separately.

17. The authoring tool according to claim 1 wherein said processor is adapted to generate a set of instructions that includes:
    a base set of instructions for controlling the basic functions of the toy; and a themed set of instructions for the base set of instructions to control the toy within the theme.

18. The authoring tool according to claim 17, wherein said processor is adapted to combine said base set and said themed set of instructions together.

19. The authoring tool according to claim 17, further comprising a compiler.

20. The authoring tool according to claim 19, wherein said compiler is adapted to compile said base set and said themed set of instructions.

21. The authoring tool according to claim 1, wherein said processor includes a coding engine adapted to transform said set of instructions into computer readable code.

22. The authoring tool according to claim 1, wherein the interface is a user interface, wherein the user interface is adapted to provide a user with a set of input windows, wherein each window corresponds to the input of a particular sub-set of content relating to the theme of the authoring tool, and wherein the output of the authoring tool is adapted to initiate output of the themed data.

23. The authoring tool according to claim 22, wherein said sub-sets of content include at least one of: theme related data, toy related data, and context related data.

24. The authoring tool according to claim 23, wherein said context related data includes at least one of: statements used by the toys to interact, a method of interaction, theme related parameters, and toy related parameters.

25. A system for generating themed data for a toy, comprising:
- an authoring tool for accessing, creating and editing said themed data, wherein said authoring tool comprises:
- an interface for receiving content relating to a particular theme, said interface being adapted to receive separately content that comprises separately both scripting data relating to the particular theme, and expression data defining the personality of said toy;
- a processor for processing said content, comprising both said scripting data and said expression data, to generate a set of instructions for operating said toy within said particular theme, wherein the processor is coupled to the interface; and
- an output for outputting said set of instructions, wherein the processor is coupled to the output;
- a server, comprising a database for storing said themed data;
- wherein the authoring tool is adapted to access the themed data via the internet, wherein the authoring tool is adapted to process the themed data into an array, and wherein said database is adapted to store said themed data in said array.

* * * * *